(12) United States Patent
Kim et al.

(10) Patent No.: US 9,873,040 B1
(45) Date of Patent: Jan. 23, 2018

(54) FACILITATING AN EVENT ACROSS MULTIPLE ONLINE GAMES

(71) Applicant: KABAM, INC., San Francisco, CA (US)

(72) Inventors: John Kim, San Francisco, CA (US); Kevin Chanthasiriphan, San Francisco, CA (US); Kevin Lee, Fremont, CA (US)

(73) Assignee: Aftershock Services, Inc., San Francisco, CA (US)

( * ) Notice: Subject to any disclaimer, the term of this patent is extended or adjusted under 35 U.S.C. 154(b) by 65 days.

(21) Appl. No.: 14/170,484

(22) Filed: Jan. 31, 2014

(51) Int. Cl.
*A63F 13/46* (2014.01)
*A63F 13/50* (2014.01)
*A63F 13/30* (2014.01)

(52) U.S. Cl.
CPC .............. *A63F 13/12* (2013.01); *A63F 13/46* (2014.09); *A63F 13/50* (2014.09)

(58) Field of Classification Search
None
See application file for complete search history.

(56) References Cited

U.S. PATENT DOCUMENTS

| | | |
|---|---|---|
| 5,816,918 A | 10/1998 | Kelly et al. |
| 5,933,813 A | 8/1999 | Teicher |
| 5,964,660 A | 10/1999 | James |
| 6,142,472 A | 11/2000 | Kliebisch |
| 6,190,225 B1 | 2/2001 | Coleman |
| 6,402,619 B1 | 6/2002 | Sato |
| 6,604,008 B2 | 8/2003 | Chudley |
| 6,745,236 B1 | 6/2004 | Hawkins |
| 6,850,900 B1 | 2/2005 | Hare |

(Continued)

FOREIGN PATENT DOCUMENTS

| | | |
|---|---|---|
| KR | 1020130137431 | 12/2013 |
| WO | 2002026333 | 1/2002 |

(Continued)

OTHER PUBLICATIONS

New Feature: Tiered Tournaments and Tournament Updates, printed from http://community.kabam.com/forums/showthread.php?171349-New-Feat on Feb. 11, 2014, 2 pages.

(Continued)

*Primary Examiner* — Milap Shah
*Assistant Examiner* — Robert T Clarke, Jr.
(74) *Attorney, Agent, or Firm* — Sheppard Mullin Richter & Hampton LLP

(57) ABSTRACT

A system and method for facilitating a cross-game competitive event are disclosed. The cross-game competitive event may measure user performance in multiple online games during an event time period. For such measurement, the cross-game competitive event may be associated with an event metric. The event metric may correspond to gameplay metrics for users of the multiple online games. The value of the event metric may be determined for a given user based on aggregation of changes in the values of gameplay metrics in the multiple online games within the event time period. An award may be distributed to the given user based on the event metric value determined for the given user upon conclusion of the cross-game competitive event.

16 Claims, 5 Drawing Sheets

(56) References Cited

U.S. PATENT DOCUMENTS

| | | |
|---|---|---|
| 6,928,474 B2 | 8/2005 | Venkatesan |
| 7,050,868 B1 | 5/2006 | Graepel |
| 7,076,453 B2 | 7/2006 | Jammes |
| 7,156,733 B2 | 1/2007 | Chiang |
| 7,192,352 B2 | 3/2007 | Walker |
| 7,197,352 B2 | 3/2007 | Gott |
| 7,326,115 B2 | 2/2008 | Baerlocher |
| 7,533,336 B2 | 5/2009 | Jaffe |
| 7,660,740 B2 | 2/2010 | Boone |
| 7,698,229 B2 | 4/2010 | Hsu |
| 7,813,821 B1 | 10/2010 | Howell |
| 7,819,749 B1 | 10/2010 | Fish et al. |
| 8,016,668 B2 | 9/2011 | Hardy |
| 8,066,571 B2 | 11/2011 | Koster et al. |
| 8,105,156 B2 | 1/2012 | Walker et al. |
| 8,147,340 B2 | 4/2012 | Brunet de Courssou et al. |
| 8,157,635 B2 | 4/2012 | Hardy |
| 8,187,101 B2 | 5/2012 | Herrmann |
| 8,226,472 B2 | 7/2012 | Van Luchene |
| 8,231,453 B2 | 7/2012 | Wolf et al. |
| 8,231,470 B2 | 7/2012 | Feeney et al. |
| 8,246,439 B2 | 8/2012 | Kelly et al. |
| 8,272,934 B2 | 9/2012 | Olive et al. |
| 8,272,951 B2 | 9/2012 | Ganz ................. 463/29 |
| 8,272,956 B2 | 9/2012 | Kelly |
| 8,282,491 B2 | 10/2012 | Auterio |
| 8,287,367 B2 | 10/2012 | Hall et al. |
| 8,287,383 B1 | 10/2012 | Etter |
| 8,287,384 B2 | 10/2012 | Auterio |
| 8,292,743 B1 | 10/2012 | Etter |
| 8,313,372 B2 | 11/2012 | Naicker et al. |
| 8,317,584 B2 | 11/2012 | Aoki et al. |
| 8,323,110 B2 | 12/2012 | Shibamiya et al. |
| 8,328,642 B2 | 12/2012 | Mosites et al. |
| 8,332,260 B1 | 12/2012 | Mysen |
| 8,332,544 B1 | 12/2012 | Ralls ................. 710/8 |
| 8,348,762 B2 | 1/2013 | Willis |
| 8,348,767 B2 | 1/2013 | Mahajan |
| 8,348,768 B2 | 1/2013 | Auterio et al. |
| 8,360,858 B2 | 1/2013 | LaRocca |
| 8,360,866 B2 | 1/2013 | VanLuchene |
| 8,360,867 B2 | 1/2013 | VanLuchene |
| 8,360,868 B2 | 1/2013 | Shvili |
| 8,366,544 B2 | 2/2013 | Walker |
| 8,366,550 B2 | 2/2013 | Herrmann et al. |
| 8,382,572 B2 | 2/2013 | Hoffman |
| 8,388,427 B2 | 3/2013 | Yariv ................. 463/9 |
| 8,401,913 B2 | 3/2013 | Alivandi |
| 8,408,989 B2 | 4/2013 | Bennett et al. |
| 8,475,262 B2 | 7/2013 | Wolf et al. |
| 8,506,394 B2 | 8/2013 | Kelly et al. ............ 463/29 |
| 8,533,076 B2 | 9/2013 | Chu |
| 8,583,266 B2 | 11/2013 | Herbrich et al. |
| 8,636,591 B1 | 1/2014 | Hawk |
| 8,758,119 B1 | 6/2014 | BronsteinBendayan |
| 8,784,214 B2 | 7/2014 | Parks et al. |
| 8,831,758 B1 | 9/2014 | Chu et al. |
| 8,843,557 B2 | 9/2014 | Ranade |
| 8,851,978 B1 | 10/2014 | Koh |
| 8,920,243 B1 | 12/2014 | Curtis |
| 8,961,319 B1 | 2/2015 | Pieron |
| 8,968,067 B1 | 3/2015 | Curtis et al. |
| 9,007,189 B1 | 4/2015 | Curtis et al. |
| 9,138,639 B1 | 9/2015 | Ernst |
| 9,256,887 B2 | 2/2016 | Santini |
| 9,257,007 B2 | 2/2016 | Santini |
| 9,259,642 B1 | 2/2016 | McNeill |
| 9,286,510 B2 | 3/2016 | Soohoo |
| 9,317,993 B2 | 4/2016 | Hardy |
| 9,375,636 B1 | 6/2016 | Wakeford |
| 9,403,093 B2 | 8/2016 | Harrington |
| 9,406,201 B2 | 8/2016 | Englman |
| 9,452,356 B1 | 9/2016 | Tsao |
| 9,452,364 B1 | 9/2016 | Curtis |
| 9,463,376 B1 | 10/2016 | Kim |
| 9,468,851 B1 | 10/2016 | Pieron |
| 9,610,503 B2 | 4/2017 | Pieron |
| 9,626,475 B1 | 4/2017 | Schultz |
| 9,656,174 B1 | 5/2017 | McLellan |
| 9,669,313 B2 | 6/2017 | Pieron |
| 9,682,314 B2 | 6/2017 | Kim |
| 2002/0023039 A1 | 2/2002 | Fritsch |
| 2002/0059397 A1 | 5/2002 | Feola |
| 2002/0094863 A1 | 7/2002 | Klayh |
| 2002/0095327 A1 | 7/2002 | Zumel |
| 2002/0115488 A1 | 8/2002 | Berry et al. |
| 2002/0119824 A1 | 8/2002 | Allen |
| 2002/0165794 A1 | 11/2002 | Ishihara |
| 2002/0183105 A1 | 12/2002 | Cannon et al. ................. 463/16 |
| 2002/0193162 A1 | 12/2002 | Walker et al. |
| 2003/0008713 A1 | 1/2003 | Ushiro et al. |
| 2003/0032476 A1 | 2/2003 | Walker |
| 2003/0157978 A1 | 8/2003 | Englman |
| 2003/0174178 A1 | 9/2003 | Hodges |
| 2003/0190960 A1 | 10/2003 | Jokipii et al. ................. 463/42 |
| 2004/0002387 A1 | 1/2004 | Grady |
| 2004/0068451 A1 | 4/2004 | Lenk |
| 2004/0143852 A1 | 7/2004 | Meyers |
| 2004/0199471 A1 | 10/2004 | Hardjono |
| 2004/0215524 A1 | 10/2004 | Parkyn |
| 2004/0224745 A1 | 11/2004 | Bregenzer |
| 2004/0225387 A1 | 11/2004 | Smith, III ................. 700/92 |
| 2004/0267611 A1 | 12/2004 | Hoerenz |
| 2005/0096117 A1 | 5/2005 | Katz et al. |
| 2005/0114223 A1 | 5/2005 | Schneider |
| 2005/0165686 A1 | 7/2005 | Zack |
| 2005/0255914 A1 | 11/2005 | McHale |
| 2006/0030407 A1 | 2/2006 | Thayer |
| 2006/0058103 A1 | 3/2006 | Danieli |
| 2006/0100006 A1 | 5/2006 | Mitchell |
| 2006/0155597 A1 | 7/2006 | Gleason |
| 2006/0200370 A1 | 9/2006 | Ratliff |
| 2006/0217198 A1 | 9/2006 | Johnson |
| 2006/0287102 A1 | 12/2006 | White et al. |
| 2007/0021213 A1 | 1/2007 | Foe et al. |
| 2007/0077988 A1 | 4/2007 | Friedman |
| 2007/0105615 A1 | 5/2007 | Lind |
| 2007/0111770 A1 | 5/2007 | Van Luchene |
| 2007/0129147 A1 | 6/2007 | Gagner ................. 463/42 |
| 2007/0155485 A1 | 7/2007 | Cuddy et al. |
| 2007/0191101 A1 | 8/2007 | Coliz et al. |
| 2007/0191102 A1 | 8/2007 | Coliz et al. |
| 2007/0213116 A1 | 9/2007 | Crawford et al. |
| 2007/0233585 A1 | 10/2007 | Ben Simon |
| 2007/0281285 A1 | 12/2007 | Jayaweera |
| 2008/0004093 A1 | 1/2008 | Van Luchene |
| 2008/0032787 A1 | 2/2008 | Low |
| 2008/0076527 A1 | 3/2008 | Low |
| 2008/0113815 A1 | 5/2008 | Weingardt |
| 2008/0124353 A1 | 5/2008 | Brodeur |
| 2008/0154798 A1 | 6/2008 | Valz |
| 2008/0171599 A1 | 7/2008 | Salo et al. |
| 2008/0194318 A1 | 8/2008 | Kralicky |
| 2008/0200260 A1 | 8/2008 | Deng |
| 2008/0214295 A1 | 9/2008 | Dabrowski |
| 2008/0234043 A1 | 9/2008 | McCaskey |
| 2008/0268946 A1 | 10/2008 | Roemer |
| 2008/0275786 A1 | 11/2008 | Gluck |
| 2009/0011812 A1 | 1/2009 | Katz |
| 2009/0017886 A1 | 1/2009 | McGucken |
| 2009/0036199 A1 | 2/2009 | Myus |
| 2009/0048918 A1 | 2/2009 | Dawson |
| 2009/0061982 A1 | 3/2009 | Brito |
| 2009/0082099 A1 | 3/2009 | Luciano, Jr. et al. |
| 2009/0204907 A1 | 8/2009 | Finn |
| 2009/0208181 A1* | 8/2009 | Cottrell ................. A63F 13/00 386/278 |
| 2009/0210301 A1 | 8/2009 | Porter |
| 2009/0234710 A1 | 9/2009 | Belgaied Hassine |
| 2009/0280905 A1 | 11/2009 | Weisman |
| 2009/0315893 A1 | 12/2009 | Smith et al. |
| 2010/0022307 A1 | 1/2010 | Steuer et al. |
| 2010/0035689 A1 | 2/2010 | Altshuler |
| 2010/0041472 A1 | 2/2010 | Gagner |

(56) References Cited

U.S. PATENT DOCUMENTS

| | | |
|---|---|---|
| 2010/0050088 A1 | 2/2010 | Neustaedter |
| 2010/0070056 A1 | 3/2010 | Coronel ........................... 700/91 |
| 2010/0094841 A1 | 4/2010 | Bardwil |
| 2010/0099471 A1 | 4/2010 | Feeney et al. |
| 2010/0107214 A1 | 4/2010 | Ganz ................................ 726/1 |
| 2010/0113162 A1 | 5/2010 | Vemuri et al. |
| 2010/0174593 A1 | 7/2010 | Cao |
| 2010/0198653 A1 | 8/2010 | Bromenshenkel |
| 2010/0210356 A1 | 8/2010 | Losica |
| 2010/0227682 A1 | 9/2010 | Reville et al. |
| 2010/0228606 A1 | 9/2010 | Walker |
| 2010/0241491 A1 | 9/2010 | Eglen |
| 2010/0306015 A1 | 12/2010 | Kingston |
| 2011/0045898 A1 | 2/2011 | Anderson |
| 2011/0065511 A1 | 3/2011 | Mahan ............................ 463/40 |
| 2011/0092271 A1 | 4/2011 | Nguyen |
| 2011/0092273 A1 | 4/2011 | Cerbini |
| 2011/0111841 A1 | 5/2011 | Tessmer |
| 2011/0112662 A1 | 5/2011 | Thompson |
| 2011/0113353 A1 | 5/2011 | Koh |
| 2011/0118002 A1 | 5/2011 | Aoki |
| 2011/0145040 A1 | 6/2011 | Zahn |
| 2011/0212756 A1* | 9/2011 | Packard ............... H04N 21/251 463/1 |
| 2011/0218033 A1 | 9/2011 | Englman et al. |
| 2011/0227919 A1 | 9/2011 | Bongio et al. |
| 2011/0250954 A1 | 10/2011 | Braund |
| 2011/0256936 A1 | 10/2011 | Walker et al. |
| 2011/0281638 A1 | 11/2011 | Bansi |
| 2011/0281654 A1 | 11/2011 | Kelly et al. |
| 2011/0282764 A1 | 11/2011 | Borst |
| 2011/0300923 A1 | 12/2011 | Van Luchene |
| 2011/0319170 A1 | 12/2011 | Shimura et al. |
| 2012/0011002 A1 | 1/2012 | Crowe |
| 2012/0015714 A1 | 1/2012 | Ocko et al. |
| 2012/0015715 A1 | 1/2012 | Luxton et al. |
| 2012/0034961 A1 | 2/2012 | Berman et al. |
| 2012/0040743 A1 | 2/2012 | Auterio |
| 2012/0040761 A1 | 2/2012 | Auterio |
| 2012/0042282 A1 | 2/2012 | Wong |
| 2012/0046111 A1 | 2/2012 | Walker |
| 2012/0047002 A1 | 2/2012 | Patel |
| 2012/0059730 A1 | 3/2012 | Jensen |
| 2012/0083909 A1 | 4/2012 | Carpenter et al. |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0130856 A1 | 5/2012 | Petri |
| 2012/0142429 A1 | 6/2012 | Muller |
| 2012/0156668 A1 | 6/2012 | Zelin |
| 2012/0157187 A1 | 6/2012 | Moshal |
| 2012/0166380 A1 | 6/2012 | Sridharan |
| 2012/0166449 A1 | 6/2012 | Pitaliya |
| 2012/0178514 A1 | 7/2012 | Schulzke |
| 2012/0178529 A1 | 7/2012 | Collard |
| 2012/0197874 A1 | 8/2012 | Zatkin |
| 2012/0202589 A1 | 8/2012 | Kelly |
| 2012/0203669 A1 | 8/2012 | Borsch |
| 2012/0215667 A1 | 8/2012 | Ganz |
| 2012/0221430 A1 | 8/2012 | Naghmouchi |
| 2012/0226573 A1 | 9/2012 | Zakas et al. |
| 2012/0231891 A1 | 9/2012 | Watkins |
| 2012/0244947 A1 | 9/2012 | Ehrlich |
| 2012/0244950 A1 | 9/2012 | Braun |
| 2012/0245988 A1 | 9/2012 | Pace |
| 2012/0256377 A1 | 10/2012 | Schneider et al. |
| 2012/0265604 A1 | 10/2012 | Corner |
| 2012/0282986 A1 | 11/2012 | Castro |
| 2012/0289315 A1 | 11/2012 | Van Luchene |
| 2012/0289346 A1 | 11/2012 | Van Luchene |
| 2012/0295699 A1 | 11/2012 | Reiche |
| 2012/0296716 A1 | 11/2012 | Barbeau |
| 2012/0302335 A1 | 11/2012 | Gregory-Brown |
| 2012/0309504 A1 | 12/2012 | Isozaki |
| 2012/0311504 A1 | 12/2012 | Van Os et al. |
| 2012/0322545 A1 | 12/2012 | Arnone et al. |
| 2012/0322561 A1 | 12/2012 | Kohlhoff ........................ 463/42 |
| 2012/0329549 A1 | 12/2012 | Johnson |
| 2012/0330785 A1 | 12/2012 | Hamick et al. |
| 2013/0005437 A1 | 1/2013 | Bethke |
| 2013/0005466 A1 | 1/2013 | Mahajan |
| 2013/0005473 A1 | 1/2013 | Bethke |
| 2013/0005480 A1 | 1/2013 | Bethke |
| 2013/0006735 A1 | 1/2013 | Koenigsberg et al. |
| 2013/0006736 A1 | 1/2013 | Bethke |
| 2013/0012304 A1 | 1/2013 | Cartwright |
| 2013/0013094 A1 | 1/2013 | Parks et al. |
| 2013/0013326 A1 | 1/2013 | Miller et al. |
| 2013/0013459 A1 | 1/2013 | Kerr |
| 2013/0029745 A1 | 1/2013 | Kelly et al. |
| 2013/0036064 A1 | 2/2013 | Osvald |
| 2013/0090173 A1 | 4/2013 | Kislyi |
| 2013/0090750 A1 | 4/2013 | Herrman et al. |
| 2013/0123005 A1 | 5/2013 | Allen et al. |
| 2013/0124361 A1 | 5/2013 | Bryson |
| 2013/0151342 A1 | 6/2013 | Citron et al. |
| 2013/0178259 A1 | 7/2013 | Strause et al. |
| 2013/0217453 A1 | 8/2013 | Briggs |
| 2013/0217489 A1 | 8/2013 | Bendayan |
| 2013/0226733 A1 | 8/2013 | Evans |
| 2013/0237299 A1 | 9/2013 | Bancel et al. |
| 2013/0244767 A1 | 9/2013 | Barclay et al. |
| 2013/0260850 A1 | 10/2013 | Carpe |
| 2013/0288757 A1 | 10/2013 | Guthridge |
| 2013/0288787 A1 | 10/2013 | Yoshie |
| 2013/0303276 A1 | 11/2013 | Weston et al. |
| 2013/0303726 A1 | 11/2013 | Mozzarelli |
| 2013/0324259 A1* | 12/2013 | McCaffrey ............... A63F 13/12 463/42 |
| 2013/0339111 A1 | 12/2013 | Ross |
| 2013/0339228 A1 | 12/2013 | Shuster |
| 2013/0344932 A1 | 12/2013 | Adams et al. |
| 2014/0004884 A1 | 1/2014 | Chang |
| 2014/0011565 A1 | 1/2014 | Elias |
| 2014/0018156 A1 | 1/2014 | Rizzotti et al. |
| 2014/0033262 A1 | 1/2014 | Anders |
| 2014/0038721 A1 | 2/2014 | Archer |
| 2014/0067526 A1 | 3/2014 | Raju |
| 2014/0067544 A1 | 3/2014 | Klish |
| 2014/0073436 A1 | 3/2014 | Takagi |
| 2014/0087864 A1 | 3/2014 | Togashi |
| 2014/0089048 A1 | 3/2014 | Bruich |
| 2014/0100020 A1 | 4/2014 | Carroll |
| 2014/0106858 A1 | 4/2014 | Constable |
| 2014/0157314 A1 | 6/2014 | Roberts |
| 2014/0180725 A1 | 6/2014 | Ton-That |
| 2014/0206449 A1 | 7/2014 | Alman |
| 2014/0206452 A1 | 7/2014 | Bambino |
| 2014/0243065 A1 | 8/2014 | Wright |
| 2014/0243072 A1 | 8/2014 | Santini |
| 2014/0274359 A1 | 9/2014 | Helava |
| 2014/0295958 A1 | 10/2014 | Shono |
| 2014/0309026 A1 | 10/2014 | Inukai |
| 2014/0329585 A1 | 11/2014 | Santini |
| 2014/0337259 A1 | 11/2014 | Lamb |
| 2015/0011305 A1 | 1/2015 | Deardorff |
| 2015/0019349 A1 | 1/2015 | Milley |
| 2015/0065241 A1 | 3/2015 | McCarthy |
| 2015/0065256 A1* | 3/2015 | Cudak ...................... A63F 13/00 463/43 |
| 2015/0273320 A1 | 10/2015 | Pieron |
| 2015/0306494 A1 | 10/2015 | Pieron |
| 2015/0335995 A1 | 11/2015 | McLellan |
| 2015/0352436 A1 | 12/2015 | Pieron |
| 2016/0121219 A1 | 5/2016 | Kim |
| 2016/0236094 A1 | 8/2016 | Pieron |
| 2016/0361654 A1 | 12/2016 | Pieron |

FOREIGN PATENT DOCUMENTS

| | | |
|---|---|---|
| WO | 2013013281 | 1/2013 |
| WO | 2013116904 | 1/2013 |

(56) References Cited

FOREIGN PATENT DOCUMENTS

| WO | WO 2013/059639 | 4/2013 |
|---|---|---|
| WO | 2015013373 | 1/2015 |
| WO | 2015153010 | 10/2015 |
| WO | 2015168187 | 11/2015 |
| WO | 2015179450 | 11/2015 |
| WO | 2015196105 | 12/2015 |

OTHER PUBLICATIONS

Wikipedia, Mafia Wars, <http://en.wikipedia.org/wiki/Mafia_Wars>, Jan. 28, 2012, 3 pages.
Quest item-WoWWiki—Your guide to the World of Warcraft <URL:http://www.wowwiki.com/Quest-item> Retrieved on Apr. 16, 2014, 1 page.
"A Wondrous Drop Event and Double EXP", [dated Aug. 22, 2012]. From flyff-wiki. [online], [retrieved on Jan. 12, 2016]. Retrievedfrom the Internet <URL:http://flyff-wiki.webzen.com/wiki/A_Wondrous_Drop_Event_and_Double_EXP>. 2 pages.
"Flyff", [dated May 25, 2013]. From Wikipedia, The Free Encylopedia. [on line], [retrieved on Jan. 12, 2016]. Retrieved from the Internet<URL:https://en.wikipedia.org/w/index.php?title=Flyff&oldid=556751091 >. 4 pages.
"Scroll of Amplification R", [dated Apr. 26, 2012]. From flyff-wiki. [online], [retrieved on Jan. 12, 2016]. Retrieved from the Internet<URL:http://flyff-wiki.webzen.com/wiki/Scroll_of_Amplification_R>. 3 pages.
Elsword—Wikipedia, the free encyclopedia, URL: en.wikipedia.org/wiki/Elsword [Retrieved Feb. 21, 2013], 6 pages.
Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.
Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.
PCT International Search Report and Written Opinion for PCT/US2016/017637 dated Apr. 7, 2016, 12 pages.
"Building Structures". War2.warcraft.org. Online. Accessed via the Internet. Accessed Aug. 9, 2014. <URL: http://war2.warcraft.org/strategy/verybasics/building.shtml>, 3 pages.
"Clash of Clans". Wikipedia.org. Online. Accessed via the Internet. Accessed Aug. 9, 2014. <URL: http://en.wikipedia.org/wiki/Clash of Clans>, 3 pages.
"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.
"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.
"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO Store&oldid=396550, http://lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_--.
"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.
City Coins. CityVille Wikia. Online. Accessed via the Internet. Accessed Aug. 9, 2014. <URL: http://cityville.wikia.com/wiki/City_Coins>, 2 pages.
"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do >, Apr. 23, 2014, 9 pages.
"Behavioural Analytics & Campaigning", http://lotaris.com/behavioural._analytics_and._Campaigning.htm, screenshot access date May 24, 2012 2:21 PM, 1 page.
"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.
FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.
Gaia "Black Friday Bundle" available on Nov. 23, 2011, from http://www.gaiaonline.com/forum/community-announcements/black-friday-big-bundles-rare-items/t.76127933/, 5 pages.
Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1-- 14-29 Hamari,Lehdonvirta.pdf, on May 26, 2015, 16 pages.
MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.
TFWiki "teamfortress wiki" available Nov. 5, 2011 retrieved from https://web.archive.org/web/20111105044256/http://wiki.teamfortress.com/wiki/Loadout, 4 pages.
UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.
Wiki "Gaia online"', available on Sep. 9, 2011, https://web.archive.org/web/20110927210155/http://en.wikipedia.org/wiki/Gaia_Online, 8 pages.
"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshop access date May 24, 2012, 2:19 PM, 1 page.
Ozeagle, "What happens if . . . answers about account types" on Lotro forum, Jan. 18, 2011,<https://www.lotro.com/forums/showthread.php?377885-What-happens-if-answers-about-the-account-types> (16 pgs).
<http://lotro-wiki.com/index.php?title=Ouest:A_Little_Extra_Never_Hurts_--_Part_2&oldid=399366>, <http://lotrowiki.com/index.php ?title=Getting_Started&oldid=349681 >. Links are to used articles. (7 pgs) Feb. 26, 2014.
"Lotro-Wiki.com" (evidence in regards to "Lord of the Rings Oline" MMORPG game),latest Dec. 22, 2011,<http://lotrowiki.com/index.php/Main_Page)(hereinafter referred to as Lotro>,<http://lotrowiki.com/index.php?title=LOTRO_Store&oldid=396550>,<http://lotrowiki.com/index.php?title=Ouest:A_Little_Extra_Never_Hurts_--_Part_1 &oldid=399597> (28 pgs).

\* cited by examiner

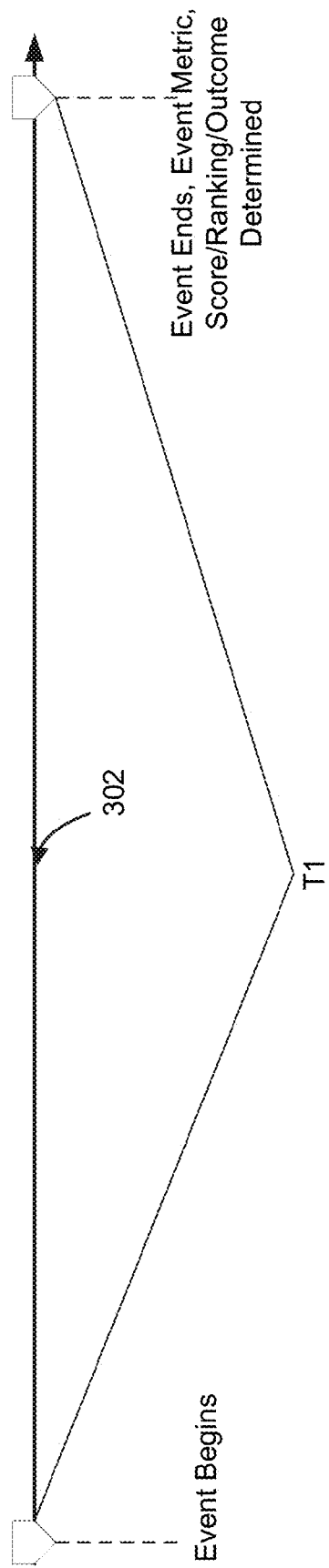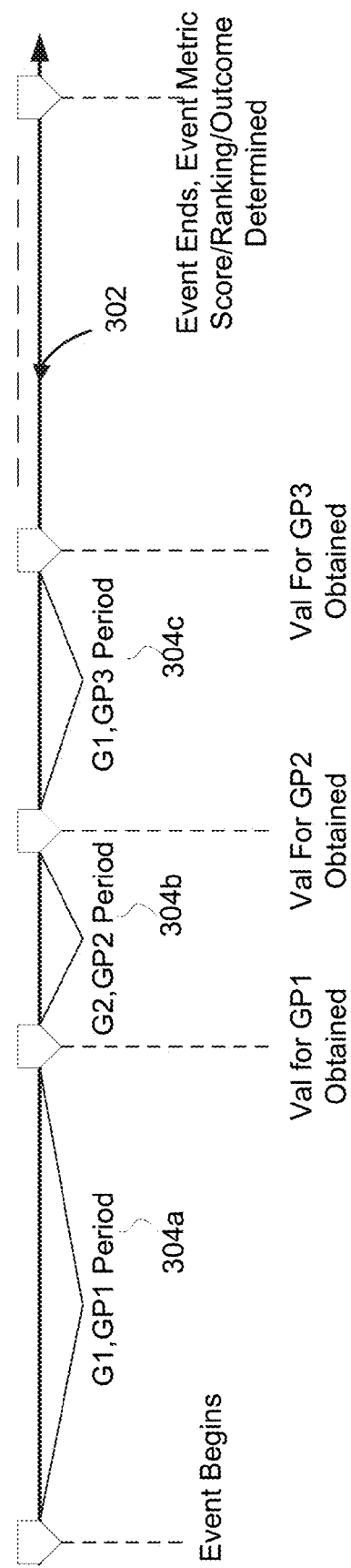
FIG. 3A
FIG. 3B

FACILITATING AN EVENT ACROSS MULTIPLE ONLINE GAMES

FIELD OF THE DISCLOSURE

This disclosure relates to facilitating an event for users of online games, the event being facilitated to enable users to earn awards by undertaking gameplays in multiple online games.

BACKGROUND

Facilitating player versus environment (PvE) combat in an online game is known. Conventional gaming system typically enables a player to control a player character in the online game to fight one or more computer-controlled characters such as monster, boss, and other types of computer-controlled characters in a PvE combat. In those systems, the PvE combat typically results in either the player character or the computer-controlled character being defeated by the other.

SUMMARY

One aspect of the disclosure relates to facilitating a cross-game competitive event for a set of online games. The cross-game competitive event may be associated with an event metric that measures the gameplay performance by users in the set of online games within an event time period. The event metric may correspond to one or more gameplay metrics for the games in the set of online games. For example, without limitation, the event metric may correspond to a first gameplay metric in a first online game and a second gameplay metric in a second online game. For determination of a value of the event metric for a given user, changes in values of the gameplay metrics corresponding to the event metric during the event time period may be determined. In some examples, the values of the event metric may be determined for the given users based on an aggregation of the changes in the values of the gameplay metrics upon conclusion of the cross-game competitive event. In some examples, the aggregation of the changes in the values of the gameplay metrics may be weighted. Awards may be determined for the individual users based on achievements in the set of the online games as reflected by the values of the event metric determined for the users. This may incentivize users of the set of the online games to engage different ones of the set of the online games. This may enhance monetization opportunities for the provider(s) of the online games.

A system configured for facilitating a tournament of contests across multiple games may include one or more servers. The servers may operate in a client/server architecture with one or more client computing platforms. The client computing platforms may be associated with the users of the game space. The servers may be configured to execute one or more of: a first game component, a second game component, a user component, a cross-game event component, an event information component, event award component, event notification component and/or other components.

The first game component may be configured to host a first online game. The first online game may be associated with a first game space in which gameplays may be facilitated for users of the first online game. Within the first game space, users may control one or more of an element in the first game space. The users may input commands with specific parameters to undertake specific deeds, maneuvers, actions, functions, spheres of actions and/or any other types of interactions within the first game space.

The second game component may be configured to host a second online game. The second game component may be configured with functionalities described above for the first game component. A second game space may be associated with the second online game. The second game space may facilitate gameplays similar to or different from those provided in the first game space. The second online game may be separate and discrete from the first online game such that users of the first online game may not interact with the second game space from the first online game. Users that participate in both the first game space and the second game space may control different characters in the different games (e.g., characters from the first online game may not be present in the second online game, and vice versa), may be associated with different realms they are building in the different games (e.g., realms present in the first online game may not be present in the second online game, and vice versa), may have separate user inventories of virtual items and/or currency that are not transferable between the first and second online games, may be members of separate alliances in the different games, and/or may the games may be separate and discrete in other ways. Progress and/or gameplay by a user in the first online game may typically have no impact on progress and/or gameplay by the user in the second online game. The first online game and the second online game may be different IP's, may be different game genres, may require access through different platforms (e.g., one online game may be a mobile game and the other may be accessed through a social network; other examples are contemplated).

The user component may be configured to manage user accounts associated with individual users. The user accounts managed by the user component may include user information and/or user profiles. The user information may include user parameters reflecting user progresses, attributes, entities controlled by the users, and/or any other user aspects related to the online games. The user profiles may include user identifying information, demographical information, time zone, and/or any other types of profile information related to the individual users. In some examples, the user accounts managed by the user component may correspond to online games individually. For example, a set of user accounts may be managed for the first online game and another set of user accounts may be managed for the second online game.

The gameplay metric component may be configured to obtain gameplay metrics for the online games and determine values of the gameplay metrics for users in the online games. A gameplay metric may be obtained by the gameplay metric component, for example, from the provider(s) of the online games via a graphical user interface accessible to the provider(s) of the online games. The given gameplay metric obtained by the gameplay metric component may include any variable related to gameplay by users in an online game. As such, the gameplay metric obtained by the gameplay metric component may reflect (e.g., measure) one or more aspects of gameplay by users in the online game. Example of a gameplay metric may include, but not limited to, military power, commerce level, production rate or output, a number of bosses killed, a number of quests engaged, average spending, average combat kills, top 10 most frequent game actions performed within a period, top 5 virtual items most used within a period, and any other gameplay metric.

The gameplay metric component may be configured to determine values of a gameplay metric for individual users in an online game. Determining gameplay metric values for users by the gameplay metric component may include identifying and/or tracking user actions in the online game. For example, the gameplay metric component may be configured to identify and track user inputs to the online game at a given time for determination of a value of the gameplay metric affected (e.g., improved) by the identified user inputs. In some examples, a gameplay metric obtained by the gameplay metric component may correspond to one or more user attributes, attributes associated with entities controlled by users, number of entities controlled by the users, and/or any other user information managed by user component. In those examples, the gameplay metric component may determine the values of the gameplay metric by simply examining the relevant user information corresponding to the gameplay metric.

The cross-game event component may be configured to facilitate a cross-game competitive event for the users of the online games. A cross-game competitive event facilitated by the cross-game event component may be associated with one or more event metrics. The event metric(s) associated with the competitive event facilitated by the cross-game event component may be used to quantify achievements by individual users in multiple online games during an event time period. A given event metric may correspond to one or more gameplay metrics of the multiple online games. For example, the given event metric may correspond to a gameplay metric in the first online game and a second gameplay metric in the second online game. Facilitating the competitive event by the cross-game event component may include determining values of the event metric(s) associated with the competitive event for individual users. The determined values of the event metric(s) for the individual users may be used to determine awards, scores, ranks, ratings, and/or any other types of event results. Determining a value of the event metric for a given user by the cross-game event component may include obtaining changes in value(s) of the gameplay metric(s) corresponding to the given event metric for the given user.

In some examples, the values of the event metric may be determined based on aggregation of the changes in the values of gameplay metrics corresponding to the event metric within the event time period. In some examples, the value of the event metric may be determined through a function of the changes in the values of the gameplay metrics. In some embodiments, the aggregation of the changes of values of the gameplay metrics based on which the event metric values are determined may be weighted. For example, in one embodiment, the aggregation may be based on one or more types of gameplay by the users in a respective online game. In some embodiments, the aggregation of the changes in the values of the gameplay metrics may be temporary for at least a portion of the event time period. For example, in one embodiment, changes in the values of the gameplay metrics by the users may be weighted during certain periods within the event time period.

The event information component may be configured to receive event information regarding a competitive event facilitated by the cross-game event component. The event information regarding a competitive event received by the event information component may include information indicating, but not limited to, an event time period, one or more event metrics, one or more event metric value determination functions, award criteria, event result determination formula, and any other event information. The event information received by the event information component may be employed by the cross-game event component to facilitate a competitive event for users of the multiple online games.

The event award component may be configured to determine awards for distribution to users upon conclusion of a competitive event facilitated by the cross-game event component. The award determination by the award component for the individual users may be based on achievements by the users as reflected values of the event metric(s) determined by the cross-game event component. A given award determined by the event award component may include, for example, virtual items and/or virtual currencies usable in online games such as the first online game or the second online game.

The event notification component may be configured to generate cross-game event notification information for presentation to users. The cross-game event notification information generated by the event notification component may include information indicating an event time period during which a completive event facilitated by the cross-game event component may run, the event metric(s) associated with the competitive event, event information, event award information, and/or any other information. In some examples, the event notification information generated by the event notification component may be presented within the online games being participated by the users, e.g., via graphical user interfaces for the online games. In some examples, the event notification information may be presented externally to the online games, e.g., via push notifications, electronic mail messages (email), voice notifications, visual alert and/or any other types of notification medium external to the online games.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like-reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3A illustrates an example of a competitive cross-game event through a timeline.

FIG. 3B illustrates another example of a competitive cross-game event.

DETAILED DESCRIPTION

Figure 1:
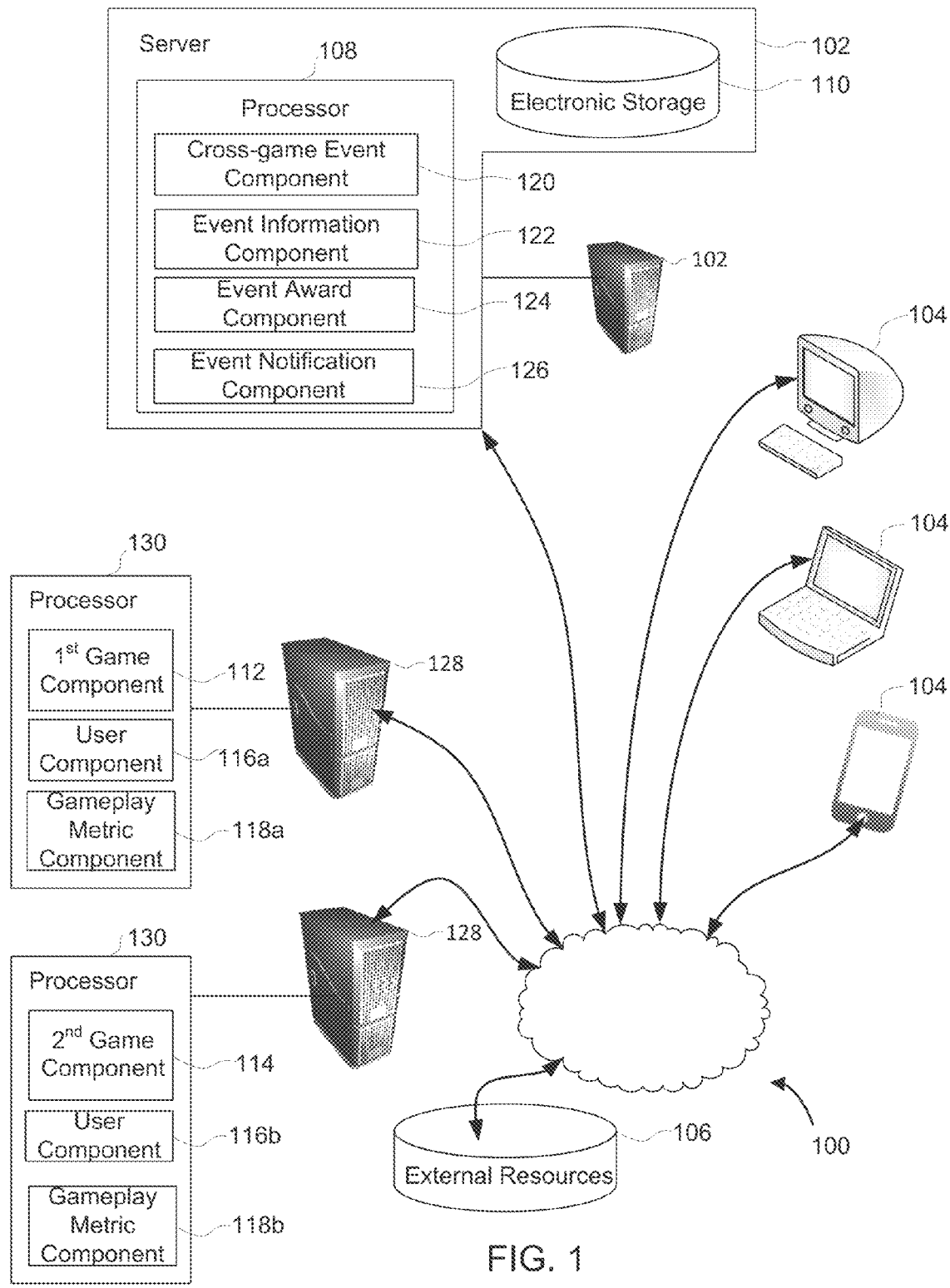
FIG. 1 illustrates a system for facilitating cross-game competitive events in accordance with one embodiment of the disclosure.

FIG. 1 illustrates a system 100 for facilitating a cross-game event across multiple online games. Providing the online games may include hosting the online games over a network. In some implementations, as shown in this example, system 100 may include one or more online game hosting servers 128 configured for hosting online games. In this example, as shown, system 100 includes an online game management server 102 configured for facilitating cross-game event in accordance with the disclosure. The servers 102 and 128 may be configured to communicate with one or more client computing platforms 104 according to a client/server architecture, and with each other. The users may access system 100 and/or the game spaces associated with the online games via client computing platforms 104. As shown, the servers 102 and 128 may comprise processors 108 and 130, respectively, configured to execute computer-readable instructions to implement system components. The computer program components may include one or more of a first game component 112, a second game component 114, a user component 116, a gameplay metric component 118, a cross-game event condition component 120, an event information component 122, an event award component 124, and/or other components.

The first game component 112 may be configured to execute an instance of a first online game. Within the instance of the first online game, users of the first online game may interact with elements in the first online game and/or with each other through gameplays provided by the first online game. The gameplays may include role-playing, first-person shooter, real-time strategy, turn-based strategy, simulation, music or rhythm playing, social interaction, twitching, and/or any other gameplays. The execution of the instance of the first online game by first game component 112 may include determining a state associated with the first online game. The state may be communicated (e.g., via streaming visual data, via object/position data, and/or other state information) from server 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in a first game space associated with the first online game. The view described by the state for the given client computing platform may correspond, for example, to the location from which the view is taken, the location the view depicts and/or other locations, a zoom ratio, a dimensionality of objects, a point-of-view, and/or view parameters of the view. One or more of the view parameters may be selectable by the user.

The instance of the first online game may be persistent. That is, the first online game may continue on whether or not individual users are currently logged in and/or participating in the online game. A user that logs out of the first online game and then logs back in some time later may find the first game space associated with the first online game has been changed through the interactions of other users with the first game space during the time the user was logged out. These changes may include changes to the simulated physical space, changes in the user's inventory, changes in other users' inventories, changes experienced by non-user characters, and/or other changes.

The instance of the first online game may comprise a simulated game space, e.g., a first game space that is accessible by users via clients (e.g., client computing platforms 104) that presents the views of the first game space to a user. The first game space may have a topography, express ongoing real-time interaction by one or more users, and/or include one or more objects positioned within the topography that are capable of locomotion within the topography. In some instances, the topography may be a two-dimensional topography. In other instances, the topography may be a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the first online game may comprise game space entities automatically controlled in the instance of the first online game. Such game space entities may not be associated with any user. As such, the automatically controlled game space entities may be generated and/or developed by artificial intelligence configured with the server 128 by a provider, administrator, moderator, and/or any other entities related to the online game. These automatically controlled entities may evolve within the game space associated with the first online game free from user controls and may interact with the entities controlled by or associated with the users, other automatically controlled game space entities, as well as the topography of the first game space. Certain manifested traits may be associated with the automatically controlled entities in accordance with the artificial intelligence configured with the server 128. As used herein, such automatically controlled game space entities in the instance of the online game are referred to as "AI entities".

The above description of the manner in which state of the first game space associated with the first online game as determined by first game component 112 is not intended to be limiting. The first game component 112 may be configured to express the first game space in a more limited, or richer, manner. For example, views determined for the first game space representing the state of the instance of the first game space may be selected from a limited set of graphics depicting an event in a given place within the first game space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the game space are contemplated.

In some implementations, the first game component 112 may be configured to implement the first game space by determining the state of the first game space at a given time. This may involve implementing results of gameplays (e.g., encounters, quests, skill challenges, treasure collection, and/or any other gameplays) in the first game space. The state change of the first game space determined by the first game component 112 may include state change(s) of one or more AI characters in the game space. For example, a state change of a given player character may be determined by the first game component 112 based on a result of a combat encounter between the given player character and a monster during an encounter in the game space. The state change of the monster may include adjustments of the one or more attributes associated with the player monster. By way of non-limiting example, hit points, strength, stamina, and/or any other attributes associated with the monster may be adjusted (e.g., reduced) as the result of the combat encounter.

Within the instance of the first online game executed by first game component 112, the users may participate in the first online game by controlling one or more of an element in the first game space associated with the online game. The user-controlled elements may include avatars, game space characters, game space units (e.g., troops), objects (e.g., weapons, horses, vehicle, and so on), simulated physical phenomena (e.g., wind, rain, earthquakes, and/or other phenomena), and/or other user-controlled elements. The user-controlled avatars may represent the users in the first game space. The user characters may include heroes, knights, commanders, leaders, generals, and/or any other game space entities that may possess strength, skills, abilities, magic powers, knowledge, and/or any other individualized attributes. The game space units controlled by the user may include troops and/or any other game space entities that may be trained, recruited, captured, and/or otherwise acquired by the users in groups or en mass. The objects controlled by the users may include weapons, vehicles, projectiles, magic items, wardrobes, boots, armor, knapsacks, medicine, healing potions, and/or any other virtual items that may be employed by the users for interaction within the first online game.

In any case, the user-controlled elements may move through and interact with the first game space (e.g., AI entities, elements controlled by other users, and/or topography in the game space) associated with the first online game. The elements controlled by a given user may be created and/or customized by the given user. The given user may have an "inventory" of virtual goods and/or currency usable within the first game space.

Controls of virtual elements in the first game space may be exercised through commands input by a given user through client computing platforms 104. The given user may interact with other users through communications exchanged within the first game space. Such communications may include one or more of textual chat, instant messages, private messages, voice communications, and/or other communications. Communications may be received and entered by the users via their respective client computing platforms 104. Communications may be routed to and from the appropriate users through server 102 (e.g., through game component 112).

A given user may input commands with specific parameters to undertake specific deeds, actions, functions, sphere of actions, and/or any other types of interactions within the first game space. For example, the given user may input commands to construct, upgrade, and/or demolish virtual buildings; harvest and/or gather virtual resources; heal virtual user-controlled elements, AI entities, and/or elements controlled by other users; train, march, transport, reinforce, reassign, recruit, and/or arrange troops; attack, manage, create, demolish, and/or defend cities, realms, kingdoms, and/or any other game space locations controlled by or associated with the users; craft or transport virtual items; interact with or compete against or along with AI entities and/or game space elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the game space. In some examples, the given user may input commands to compete against elements in an environment within the game space—i.e., Player vs. Environment (PvE) activities. In some examples, the given user may input commands to compete against each other within the game space—i.e., Player vs. Player (PvP) activities.

The first game component 112 may be configured to execute user actions to facilitate interaction of the users with the first game space and/or each other in response to receiving game space commands input by the users. Execution of the user action by the first game component 112 may produce changes to the game state, which may reflect progresses and/or results of the user actions. In some examples, state changes caused by the execution of the user actions may be recorded in the electronic storage 110 to facilitate persistency throughout the instance of the first online game. In some examples, execution of the user actions may not produce persistent changes to the game state (e.g., a user character jumping forward and backward successively may not produce any perceivable game state changes to other users).

Within the instance of first game space executed by the first game component 112, player characters may encounter game space elements such as, without limitation, non-player characters including monsters, bosses, creatures, and/or any other non-player characters, objects, buildings, virtual items, virtual containers (e.g., mystery boxes), and/or any other game space elements. When player characters are exploring a specific area (such as a dungeon), moving through heavily patrolled territory (such as an armed camp or the border between unfriendly nations), or traveling through a heavily populated zone (such as a town), a monster or monsters associated with the area may appear and encounter the player character. For example, a given player character may encounter a group of monsters at a location within the first game space, e.g., in a dungeon. The encounter may result in one or more combative actions between the player characters and the group of monsters.

The user actions executed by the first game component 112 may include combat actions enabling users to direct user entities to compete against AI entities and/or against elements controlled by other users in combats. The combat actions may include real-time combat actions through which the users may direct user entities (e.g., avatars) to perform maneuvers in real or near-real time; may include turn-based combat actions through which the users may direct user entities (e.g., user character, troops, and/or combat equipment) to inflict damages and/or resist damages; may include strategy combat actions through which the users may position the user entities strategically in combats; and/or may include any other types of combat actions.

Within the first game space associated with the first online game hosted by the first game component 112, an entity such as a game space location, a building, a resource core, a character, troop, an animal, and/or any other type of entity may exist. An entity in the first game space may be associated with one or more data values—i.e., attributes. For example, a building in the first game space may be described by its level, type, production, cost, upkeep, and/or any other building attributes. A user character may be described by its strength, health, abilities, skills, level, maneuvers, magic power, and/or any other character attributes. Some attributes associated with an entity in the first game space may affect the gameplay in the first game space. For example, a production rate (e.g., converting a type of resources in the first game space to another virtual entity or item) associated with a building controlled by a user may affect the gameplay by the user in the online game; a movement rate (e.g., a number of tiles the troop may traverse in one turn) associated with a unit of troops controlled by the user may affect the gameplay by the user in the online game; and so on.

Within the first game space associated with the first online game, the users may control game space locations to generate revenues, productions, resources, troops, culture, wonders, special units, and/or any other types of output enabled by the game space locations controlled by the users. The user-controlled game space locations may include game space towns, cities, kingdoms, castles, villages, fortresses, landmasses, resource cores, and/or any other types of game space locations. Typically, through controlling such virtual locations, the users may grow populations, construct infrastructures, conduct commerce, collect taxes, raise troops, train special units, train knights, and/or any other user characters, research technologies, gain skills and/or abilities, and/or undertake any other actions, functions, deeds, or sphere of actions as enabled by such game space locations. For example, a given user may control multiple cities in the game space and the cities may generate revenues to fund the given user activities within the game space; may generate troops; may generate growth in science; may produce weapons; may generate production; may produce food; and so on.

The users may control resource cores in the first game space associated with the first online game hosted by the first game component 112. A resource core is a type of game space object that may provide specific raw materials, resources, currencies, substances, and/or any other game space elements when harvesting actions are performed by user characters with proper skills, equipment, gears, formulas, time duration, and/or any other harvesting parameters. Resource cores may or may not be visible to the users, depending on the users' skills. Resource cores may be depleted due to harvesting actions by users and in some examples may be destroyed in the game space associated with the online game. In some examples, new resource cores may be created to replace the destroyed ones in the game space at times determined by the provider, administrator, moderator, and/or any other entities related to the game space. Examples of resource cores may include mines, rivers, wells, oceans, swamps, mountains, forests, boxes, pets, plants, and/or any other game space locations or objects.

Within the first game space associated with the first online game hosted by the first game component 112, user levels may be established to facilitate and/or incentivize user advancements. Users may receive virtual points for performing actions, participating in game space activities, interacting with game space elements and/or other users, and/or for engaging in any other interactions provided by the game space. A user may advance to a next level when a certain goal has been reached, an end condition has been fulfilled by the user in the online game, and/or the points acquired by the user have reached a threshold corresponding to the next level. Advancements in user levels typically result in attribute boosts, skill boosts, resistance boosts, higher status, and/or any other types of user progression in the game space. In some examples, for different categories of gameplays, skills, abilities, and/or any other areas that may be progressed by users, different levels may be established. For example, experience levels may be established in the online game to reflect overall experiences of the users, levels in certain skills may be established to reflect user progressions in acquiring or mastering these skills in the online game, and so on.

The second game component 114 may be configured to execute an instance of a second online game. The second game component 114 may be configured with functionalities described herein for first game component 112. A second game space may be associated with the second online game. The second game space may provide gameplays similar to or different from those provided by the first game space. As shown in this example, the second game component 114 may be hosted by a server 128 (or servers) different from that (or those) hosting the first online game. However, this is only illustrative. In some examples, first and second online games may be hosted by the same server 128.

In any case, the second game space associated with the second online game may be separate and discrete from the first game space associated with the first online game. Such a property of separation between the first and second online games may involve separate client-side applications for invoking respective online games, separate game space interfaces, separate game states, separate game characters, separate game rules, separate game mechanics, separate game objectives, separate users, and/or any other separate properties that distinguish the first game space associated with the first online game from the second game space associated with the second online game. By way of non-limiting example, the first online game may be an online game in which users play kingdom lords in the first game space that simulates a medieval world; and the second online game may be an online game in which users play future characters within the second game space that simulates a future world. In that example, the first online game may be separate and discrete from the second online game such that users of the first online game may not interact with the second game space from the first online game (e.g., through a game space interface of the first online game); and the users of the second online game may not interact with the first game space from the second online game. As described above, this may involve, but not limited to, facilitating different game space interfaces for user interaction with the first online and second online games (e.g., a dedicated game space interface for the first online game and a dedicated game space interface for the second online game), maintaining separate state information corresponding to the first and second game spaces, maintaining separate user accounts associated with the first and second online games, providing different gameplays, characters, simulations, topography, and/or any other elements in first online game than in the second online game, and/or any other operations for operating the first and second online games separately and independently.

Users may participate in both the first game space associated with the first online game and the second game space associated with the second online game. Users participating in the first game space and second game space may control different characters in the different games (e.g., characters from the first online game may not be present in the second online game, and vice versa), may be associated with different realms they are building in the different games (e.g., realms present in the first online game may not be present in the second online game, and vice versa), may have separate user inventories of virtual items and/or currency that are not transferable between the first and second online games, may be members of separate alliances in the different games, and/or may the games may be separate and discrete in other ways. Progress and/or gameplay by a user in the first online game may typically have no impact on progress and/or gameplay by the user in the second online game. The first online game and the second online game may be different IP's, may be different game genres, may require access through different platforms (e.g., one online game may be a mobile game and the other may be accessed through a social network; other examples are contemplated).

In some examples, the first and second online games may be developed and/or hosted by the same provider(s). In those examples, an interface may be implemented on a client computing platform 104 enabling a user to select which online game to participate in. For example, an icon representing the first online game and an icon representing the second online game may be presented in the interface side by side for the user to select which online game to participate in. In some other examples, the first and second online games may be accessed through webpages over the Internet such that users may be logged into the first or second online games through the webpages. Other examples of accessing first and second online games are contemplated.

The user component 116 may be configured to manage user accounts associated with the individual users of the online games. The user accounts may comprise one or more user profiles and/or user information stored by server 102, one or more of the client computing platforms 104, and/or other storage locations. The user information associated with a given user may comprise one or more user parameters related to the given user. The one or more user parameters may include parameters indicating attributes associated with the user. As used herein, such attributes are referred to as "user attributes". A value of user attribute may describe a state of a characteristic associated with the user in the online game. For example, a common user attribute is experience (XP) associated with the user in the online game. Other examples of user attributes may include a reputation score, a rank, a skill score, a level of knowledge, average spending, a role, a class, a handle (e.g., username), alliance(s), friend(s), and/or any other user attributes associated with the user in the online game. The value of a given user attribute may be numerical (e.g., points, amount, score, rank, ratings, grades, or any other type of numerical value), descriptive (e.g., text for user name, user race, role), progressive (e.g., high, medium, low), pictorial (e.g. an image representing an alliance associated with the user), and any other type of value for user attribute.

The user information associated with a given user as managed by the user component 116 may include information indicating inventory of game space entities associated with the user in the online game. An inventory associated with a given user as managed by the user component 116 may provide an accounting of virtual items, such as virtual buildings, resources, weapons, objects, and/or any other virtual items; characters, such as user characters, avatar, heroes, troops, and/or any other type of characters; virtual currencies; and/or any other game space elements that have been procured, controlled by, and/or otherwise associated with a given user in the online game. Such accounting of entities associated with users may reflect a balance, e.g., a quantity of the entities associated with the user in the online game. By way of a non-limiting example, the given user may have an X number of virtual currencies, a Y number of a virtual resource (e.g., iron, ore, wood, coal, etc.), a Z number of troops, a W number of user characters and any other entities associated with the user in the online game.

Balances of entities in the user inventory may increase, replenish, or exhaust in response to the user acquiring or consuming the virtual items through a virtual store operated by the provider of the game space, user actions in the game space (e.g., acquiring virtual objects, harvesting resources, consuming resources for crafting, etc.), game space activities participated in by the user, and/or other events associated with the user in which the user may acquire and/or consume virtual items. For example, construction actions initiated by users may consume specific resources in accordance with resource requirements associated with the construction actions, and the user inventory may exhaust the specific resource in the user inventory during execution of the construction. Conversely, users may acquire virtual containers, resources, virtual items, and/or other game space elements in the instance of the game space, and the balance of the virtual entities in the user inventory may increase accordingly to reflect the user acquisition.

As described above, an entity associated with a user as indicated by the user inventory may be associated with one or more attributes describing characteristics of the entity. For example, without limitation, a user character may be associated with one or more character attributes including, but not limited to, health (e.g., hit points), strength, power, mana, spells, morale, weapons, magic items, items carried, speed, level, appearance, race, initiative score, action points, skills, ability score, defense abilities, attack abilities, special abilities, and/or any other attributes. As another example, a building controlled by the user may be associated with one or more building attributes such as, but not limited to, hit points, level, production rate, upkeep, virtual items produced, technology produced, and/or any other type(s) of building attributes.

The level attribute associated with the user character may reflect relative adventure experiences by the user character in the game space. For example, a level 10 user character may be more powerful and able to take tougher challenges than a level 5 user character. With each new level the user character attains in the game space, the user becomes more powerful and capable, which may be reflected by enhancements in various characteristics associated with the user character. In some exemplary implementations, the level associated with the user character may be manifested via numerical number(s) expressed as experience points ("XP").

The ability attribute associated with the user character may include strength, dexterity, constitution, intelligence, wisdom, charisma, perception, diplomacy, negotiation, and/or any other abilities. Typically, the abilities associated with the user character may be represented by numeric score, reflecting quality of these abilities by the user character. For example, the user character may be associated with an ability score of 18 (out of 20) in strength, which may mean the user character has excellent strength. On the other hand, the user character may be associated with an ability score of 5 (out of 20) in wisdom, which means the user character has poor intelligence. Typically, as the user character progress through adventures in the game space, the ability scores associated with the user character may increase or decrease along with the level associated with the user character; and the user character may acquire new abilities when reaching certain milestones in the game space.

A number of hit points may be associated with the user character reflecting how much damage the user character may withstand from attack; a number of stamina points may be associated with the user character reflecting how much energy the user character may expand for actions; and so on. The skill attributes associated with the user character may represent training, education, and/or any other learned aspects of the given AI character in the game space. Common examples of skills that may be associated with the user characters may include, but not limited to, perception, thievery, evasion, heal, endurance, diplomacy, religion, and any other skills.

The user character may be associated with an inventory of one or more virtual items controlled by the user character in the given game space. For example, the user character may carry virtual items such as, without limitation, a sword, armor, glove, healing potion, and/or any other virtual items as gear in the game space. The inventory of virtual items controlled by the user character may be assigned by the user from virtual items controlled by the user. For example, the user character may be associated with one or more body slots for various gears worn by the user character, and the user may assign virtual items controlled by the user to the body slot(s).

Typically, a building controlled by the user may convert one or more types of virtual resources and/or virtual items into any other type of virtual resources and/or virtual items. The building attributes associated with a given building may reflect various characteristics of the conversion associated with the given building in the online game.

In any case, the user information described above as managed by the user component 116 may be associated with individual user accounts of the online games. As shown in this example, a set of user accounts may be managed by the user component 116a provided by the game host server that hosts the first online game. The set of user accounts managed by the user component 116a may comprise user information regarding individual users in the first online game. As also can be seen in this example, another set of user accounts may be managed by user component 116b provided by the server 130 that hosts the second online game. That set of user accounts may comprise user information regarding individual users in the second online game. In this example, the user components 116a and 116b may be configured to communicate with each other for determining if a given user is participating in the first online game and as well as in the second online game. For example, the given user may be associated with a first user account in the first online game and a second user account in the second online game, and the user component 116a and 116b may communicate with each other to determine the first user and second user accounts belong to the same user—i.e., the given user. However, this is not necessarily the only case. A unified user component 116 is contemplated such that an individual account associated with a given user as managed by the user component 116 may comprise user information regarding the first and second online games for the given user.

The gameplay metric component 118 may be configured to obtain gameplay metrics for the online games and determine values of the gameplay metric for users in the online games. A given gameplay metric obtained by gameplay metric component 118 may include any variable related to gameplay by users in a respective online game. As such, the gameplay metric obtained by the gameplay metric component 118 may reflect (e.g., measure) one or more aspects of gameplay by users in the respective online game. Example of a gameplay metric may include, but not be limited to, military power, commerce level, production rate or output, a number of bosses killed, a number of quests engaged, average spending, number of combats engaged in a period, top 10 most frequent game actions performed within a period, top 5 virtual items most used within a period, and any other gameplay metric.

For example, without limitation, a gameplay metric may be obtained by the gameplay metric component 118 to measure military power of users in the first online game. In another example, a gameplay metric may be obtained by the gameplay metric component 118 to measure commerce level by the users in the first online game. In yet another example, a gameplay metric may be obtained to measure production of virtual items by users in the second online game. In still another example, a gameplay metric may be obtained to measure a number of combats engaged by the users in the first online game. Other examples of gameplay metric are contemplated. In some examples, the gameplay metric component 118 may obtain gameplay metrics from the provider, administrator, moderator, and/or any other entities related to the online games, e.g., via a graphical user interface. For example, the provider(s) of the online game may provide one or more gameplay metrics of interest to the provider(s) via a graphical user interface.

As used herein, gameplay by users in a given online game will be referred to as user actions in that online game for addressing, directly and indirectly, one or more objectives associated with the given online game. Examples of gameplay by the users in the given online game may include military actions (e.g., defeating opponents, NPCs, or other users' characters in encounters or combats), logistic actions (e.g., marching troops, transporting weapons, supplying food, resources, and any other logistic actions), planning actions (e.g., crafting weapons, raising troops, training troops, developing heroes, building or upgrading buildings, and any other planning actions), production actions (e.g., farming, prospecting, and mining for resources, producing units, and any other user actions related to production activities in the online game), commerce actions(e.g., trading for virtual resources and/or items), exploratory actions (e.g., exploring uncharted game space locations or area, surveying game space locations controlled by other users, and any other exploratory actions), social interaction actions (e.g., collaborating with other users, assisting other users, challenging other users, and/or any other social interaction actions), participation in a quest, campaign, event, team play, and any other type(s) of user actions in the online game.

The gameplay metric component 118 may be configured to determine values of a gameplay metric for individual users in a respective online game. Determining gameplay metric values for users by the gameplay metric component 118 may include identifying and/or tracking user actions in the respective online game. For example, the gameplay metric component 118 may be configured to identify and track user inputs to the online game at any given time for determination of a type of gameplay engaged by the users that may be of interest to the provider(s) of the online game as reflected by a gameplay metric obtained from the provider(s). For instance, the gameplay metric component 118 may identify that a given user has attacked an NPC at a specific location within the first online game; may identify that the given user has started a crafting process in the second online game to craft a rare virtual item; may identity that the given user has assisted another user in the first online game by transferring an amount of virtual resources to that user's inventory; and identify any other user actions in the respective online game. Based on such identified user actions, the gameplay metric component 118 may determine a change in the value of corresponding gameplay metric(s). For instance, without limitation, the user attacking the NPC at the specific location within the first online game may increase the value of a gameplay metric measuring military power of the user in the first online game by 100 points.

In some examples, a gameplay metric obtained by gameplay metric component 118 may correspond to one or more user attributes, attributes associated with entities controlled by users, the number of entities controlled by the users, and/or any other user information managed by user component 116 as specified by the provider, administrator, moderator, and/or any other entities related to the online game.

In those examples, the gameplay metric component 118 may determine the values of the gameplay metric by simply examining the relevant user information corresponding to the gameplay metric. For example, without limitation, the provider(s) of the first online game may specify that the gameplay metric measuring user military power in the first online game should correspond to attack abilities of the user character(s), attack power of the user characters, number and levels of troops, weapons, military buildings (e.g., towers) controlled by the users, and any other attributes reflecting military power of the users in the first online game. In another example, a gameplay measuring user commerce level in the second online game may be specified by the provider(s) of the second online game as corresponding to a number of commerce units controlled by the users (e.g., merchants), types of trading structure controlled by the user, number and level of transportation units controlled by the users, number of roads controlled by the users, types of transportation infrastructure controlled by the users, and/or any other attributes. In these examples, determining the values of such gameplay metric for the users by gameplay metric component 118 may involve obtaining the corresponding attribute values from the user component 116.

In any case, the gameplay metric component 118 may determine the values of a given gameplay metric for the users based on one or more functions, formulas, tables, or any other types of specifications provided by the provider, administrator, moderator, and/or any other entities related to the online games. For example, for the gameplay metric measuring user military power in a given online game, a table may be provided by the provider(s) of the online game specifying points associated with corresponding user actions, user attributes, entity attributes, and/or any other elements that may be used to quantify military power of the user in the given online game. For instance, the table may specify that for every 100 units of troops trained by a given user, one military power point may be given to the user, for a level 1 barrack erected by the user, 1 military power point may be given to the user, for a level 10 sword acquired by the user, 3 military power point may be given to the user, and so on. In that instance, the gameplay metric component 118 may determine a value of the gameplay metric measuring military power of the given user in the given online game in accordance with such a table.

In any case, as can be seen from this example, individual game host servers 128 may be configured with gameplay metric component 118 for providing functionality attributed to gameplay metric component 118 described herein. As shown in this example, a gameplay metric component 118a is provided by the server 128 that hosts the first online game for determining values of gameplay metrics for users of the first online game; and a separate gameplay metric component 118b is provided by the server 128 that hosts the second online game for determining values of gameplay metrics for users of the second online game. However, this is not intended to be limiting. In some other examples, an integrated gameplay metric component 118 may be provided for determining values of gameplay metrics for both the first and second online games.

The cross-game event component 120 may be configured to facilitate a competitive event for the users of multiple online games. By way of non-limiting example, the cross-game event component 120 may facilitate a competitive event such that a user should undertake certain game actions or activities in the first and second online games during an event time period. That is, in that example, to engage the competitive event facilitated by the cross-game event component 120, the given user should log into the first online game to undertake certain game actions in the first online game and as well log into the second online game to undertake certain game actions in the second online game during the event time period. Such a competitive event facilitated by the cross-game event component 120 may be associated with one or more event metrics to measure relevant user performance in the multiple online games. The event metric(s) associated with the cross-game competitive event may be specified by a provider, administrator, moderator, and/or any other entities related to the multiple online games. For measuring relevant user performance in the multiple online games during the event time period, a given event metric associated with the competitive event may correspond to one or more gameplay metrics for the multiple online games. By way of non-limiting example, the competitive event may be associated with an event metric measuring user military performance both in the first online game and second online game during the event time period; may be associated with another event metric measuring user crafting performance in the second online game during the event time period; may be associated with a third event metric measuring gameplay related to commerce by users in the first online game during the event time period; and may be associated with any other event metric(s).

In some examples, the cross-game event component 120 may be controlled by the provider(s) of the online games, for example via the event information component 122 described below. As will be described in connection with the event information component 122, the cross-game event component 120 may be instructed by the provider(s) of the online games to start facilitating a given competitive event for the users of the multiple online games. For instance, the event information received by the event information component 122 may indicate control information from the provider(s) of the online games instructing the cross-game event component 120 to start facilitating a competitive event for the users of the online games.

Facilitating the competitive event by the cross-game event component 120 may include determining values of the event metric(s) associated with the competitive event for individual users. The determined values of the event metric(s) for the individual users may be used to determine awards, scores, ranks, ratings, and/or any other types of event results. As will be discussed in connection with the event information component 122, cross-game event component 120 may determine values of a given event metric in accordance with the event information obtained by the event information component 122. For example, the event information may include a table, a formula, a specification, and any other types of constructs by which values of the given event metric may be determined. A given event metric may correspond to one or more gameplay metrics in different ones of the multiple online games. For example, without limitation, the given event metric may correspond to a first gameplay metric for the first online game, a second gameplay metric for the second online game, and any other gameplay metric(s) for any other online game(s).

Determining a value of the event metric for a given user by cross-game event component 120 may include obtaining changes in value(s) of the gameplay metric(s) corresponding to the given event metric for the given user. Using the example described above, the given event metric may correspond to the first gameplay metric in the first online game and second gameplay metric in the second online game. In that example, for determining the value of the event metric for the given user during the event time period, the cross-game event component 120 may obtain changes in the values of the first gameplay metric and changes in the values of the second gameplay metric during the event time period for the given user. This may involve resolving user accounts for the given user in the first and online games (e.g., acquiring a username for the given user in the first online game and another username for the given user in the second online game), querying the gameplay metric components 118a and 118b during the event time period periodically for the values of the gameplay metrics for the given user, and any other operations. In some examples, the cross-game event component 120 may examine game state information associated with the individual online games periodically during the event time period for obtaining changes in values of gameplay metrics in the online games.

In some examples, the values of the event metric may be determined based on aggregation of the changes in the values of gameplay metrics corresponding to the event metric within the event time period. For example, without limitation, the determination of the value of the event metric corresponding to the first gameplay metric in the first online game and the second gameplay metric in the second online game may be based on an aggregation of a change in the value of the first gameplay metric and a change in the value of the second gameplay metric within the event time period. In some examples, the value of the event metric may be determined through a function of the changes in the values of the first and second gameplay metric. Such a function may be configured with cross-game event component 120 at a configuration stage of the system 100 (e.g., during development time of the online games), may be obtained dynamically from the provider, administrator, moderator, and/or any other entities related to the online games (e.g., by receiving the event information described below), and/or may be obtained by cross-game event component 120 in any other way(s).

As an illustration, in one embodiment, the values of the event metric may be determined by the cross-game event component 120 by simply aggregating the changes in values of the gameplay metrics corresponding to the given event metric. For example, the event metric may measure military performance by the users in the first and second online games during the event time period. In that example, the cross-game event component 120 aggregate changes in the values of the gameplay metric(s) corresponding to the event metric, such as a military power gameplay metric for the first online game and a military readiness gameplay metric for the second online game. In that example, the cross-game event component 120 may simply aggregate changes in the value of the military power gameplay metric in the first online game for the given user, say 100 points, and in the value of the military readiness gameplay metric for the second online game for the given user, say 200 points, during the event time period, and determine the value of the event metric for the given user as 300 points.

In some embodiments, the aggregation of the changes of values of the gameplay metrics based on which the event metric values are determined may be weighted. Such weighted aggregation may be in various forms. For example, in one embodiment, the aggregation may be based on one or more types of gameplay by the users in the respective online game. In that example, changes in values of the gameplay metric(s) corresponding to the one or more types of gameplay by the users may be improved (e.g., boosted) when aggregated. By way of non-limiting example, a change in the value of a gameplay metric measuring user military power in the first online game may be boosted when aggregated if the change in the value is caused by a desired gameplay, e.g., such as defeating a super NPC in the first online game. For instance, if defeating the super NPC by a given user in the first online game increases the value of gameplay metric measuring military power by 100 points, the 100 points may be boosted as 200 points when aggregated for the value of the event metric for the given user. In another instance, the military power points earned by the user during a quest in the first online game is boosted (e.g., doubled) when aggregated for determination of the event metric value for the users. This may incentivize the user to participate in the quest during the event time period. Examples of a type of gameplays based on which the change in a corresponding gameplay may be weighted may include military action, logistic action, planning action, commerce action, social interaction with other users, participation in a quest, participation in a campaign, participation in team play, and/or any other type of gameplays.

For achieving such weighted aggregation, the cross-game event component 120 may consult the gameplay metric component 118 for the types of gameplay that is associated with a change in value of the gameplay metric. For instance, the cross-game event component 120 may query the gameplay metric component 118 for determination a type or types of gameplays associated with a change in value of a given gameplay metric by a user. In some examples, the provider, administrator, moderator, and/or any other entities related to the online games may specify which type(s) of gameplays may be weighted for the aggregation of the changes in the values of the game metrics corresponding to the event metric via the event information described below.

In some embodiments, the aggregation of the changes in the values of the gameplay metrics may be temporary for at least a portion of the event time period. For example, in one embodiment, changes in the values of the gameplay metrics by the users may be weighted during certain periods within the event time period. For instance, the changes of values in the gameplay metric by the users in the first online game during a time period or time periods (e.g., on a Monday, 8 am-10 am every day, the last 24 hours, the first 24 hours, and any other time period(s)) within the event time period, may be boosted when aggregated for determination of the values of the event metrics. As an illustration, thus not intended to be limiting, a user may earn 100 points in military power game metric in the first online game during a certain period and the 100 points earned during that period may be counted as 200 points when aggregated for determination of the value of the event metric for the user.

The event information component 122 may be configured to receive event information regarding a competitive event facilitated by the cross-game event component 120. The event information regarding a competitive event received by the event information component 122 may include information indicating, but not limited to, an event time period, one or more event metrics, one or more event metric value determination functions, award criteria, event result determination formula, and any other event information. As described above, the event information received by the event information component 122 may be employed by cross-game event component 120 to facilitate a competitive event for users of the multiple online games.

Figure 2:
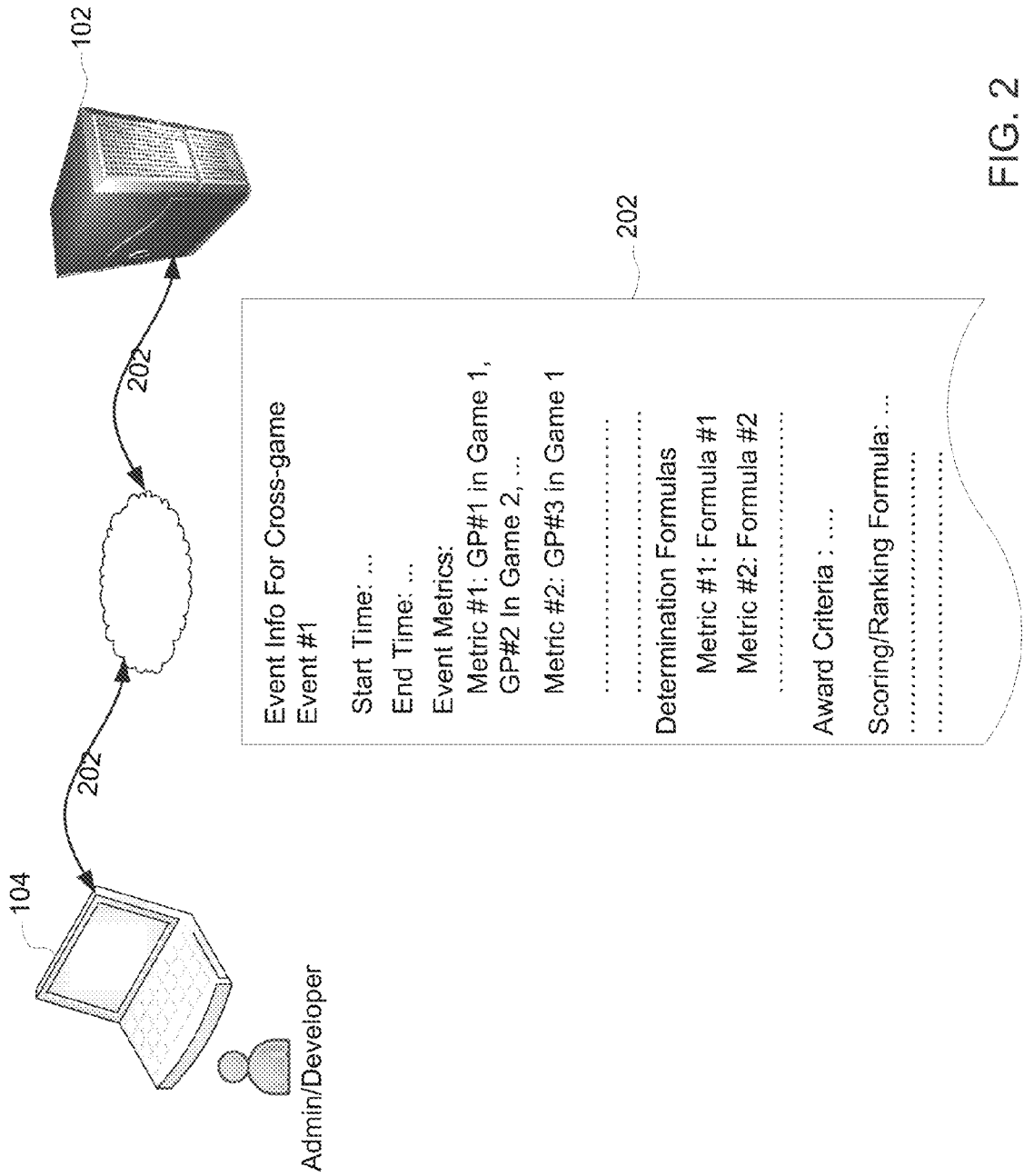
FIG. 2 illustrates one example of receiving event information for facilitating a cross-game event using the system shown in FIG. 1.
Figure 4:
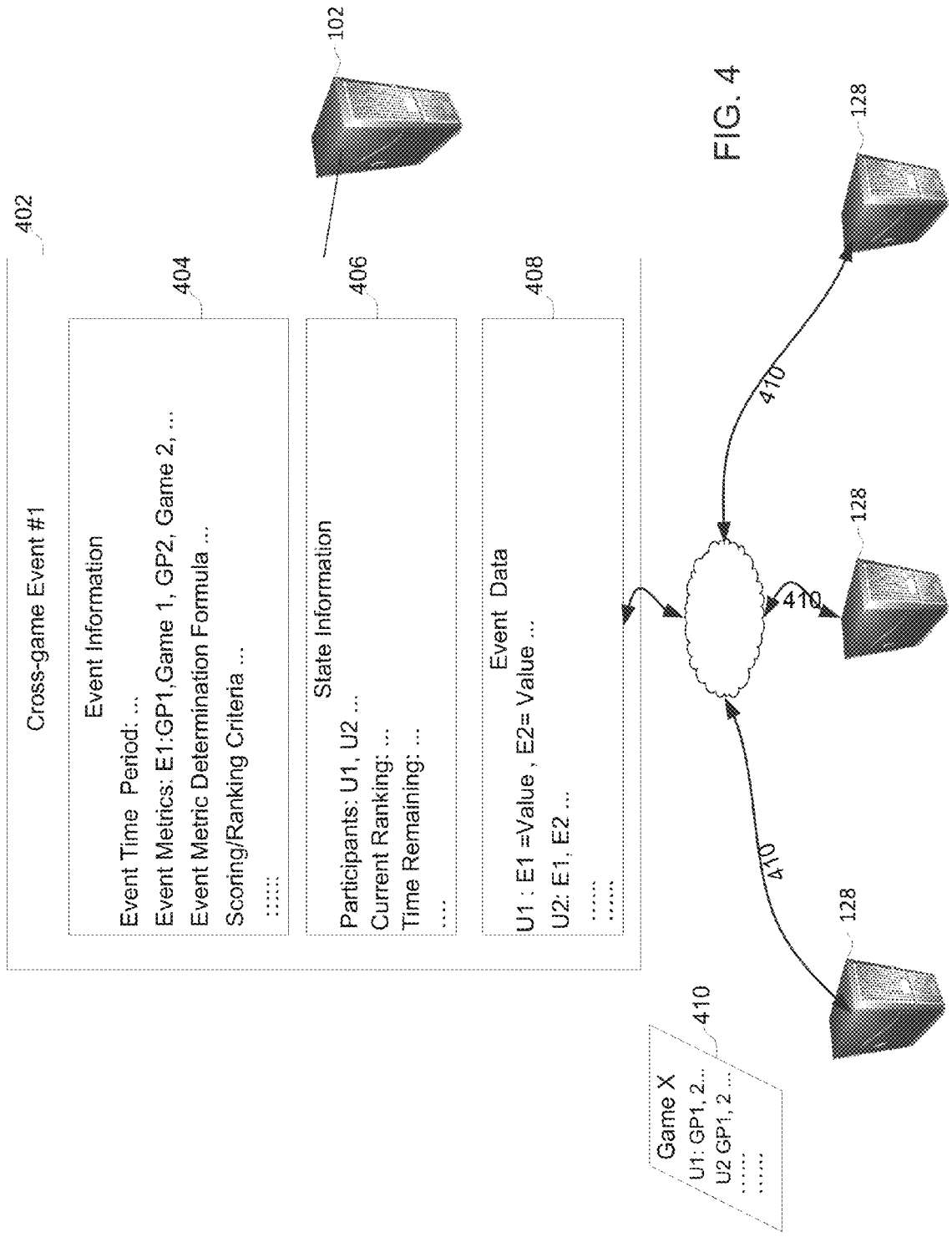
FIG. 4 illustrates an example of facilitating a competitive event using the event information illustrated in FIG. 2.

FIG. 2 illustrates one example of receiving event information for facilitating a cross-game competitive event in accordance with one embodiment of the disclosure. As shown in this example, the server 102 may receive event information 202 from a client computing platform 104 associated with an administrator or developer of the online games. The client computing platform 104 may provide an interface to the administrator or the developer for providing the event information 202. The interface may include a graphical user interface, a programming interface, a file, a command line utility, and/or any other type of interface for providing event information 202. The interface implemented on the client computing platform 104 is not shown in this example for clarity of illustration. In any case, as shown, the event information 202 may include event time information, indicating a start time and end time associated with a competitive event or events. Such event time information may be used, for example, by the cross-game event component 120 to facilitate the competitive event during an event time period defined by the start and end time indicated in the event information 202. In some examples, the event time information may include information indicating sub-periods in which individual activities may be desired to be performed by users in respective online games. An example of such sub-period is illustrated in FIG. 4.

As also shown, the event information 202 may include one or more event metrics associated with the competitive event to be facilitated by the cross-game event component 120. As described above, a given event metric, such as event metric #1 and #2 shown in this example, associated with the competitive event may be used to measure user performance related to certain gameplays in the online games. As shown in this example, the event metric(s) associated with the competitive event may correspond to one or more gameplay metrics for the individual online games. In this example, the event metric #1 is associated with a gameplay metric #1 for game 1 (e.g., the first online game), and gameplay metric #2 for game 2 (e.g., the second online game); and the event metric #2 is associated with a gameplay metric #3 for game 3.

As still shown in this example, the event information 202 may include formulas indicating how values of event metric(s) associated with the competitive event may be determined for individual users based on the corresponding gameplay metrics. In this example, as shown, a formula #1 may be specified for event metric #1 and a formula #2 may be specified for event metric #2. However, this is merely illustrative. In some other examples, the event information 202 may specify one formula for value determinations for multiple event metrics. In any case, the formula specified by the event information 202 may indicate how a value of the event metric may be determined for a user as a function of the changes in gameplay metric(s) corresponding to the event metric during the event time period. An exemplary event metric determination formula is illustrated below:

Value of Event Metric Value=(change #1 in Value of Gameplay Metric #1×factor #1)+change #2 in Value of Gameplay Metric #1+ . . . +(Change #1 in Value of Gameplay Metric #2)×factor #X+ (change #2 in Value of Gameplay Metric #2) . . . , wherein factor #1, X is greater than 0

As can be seen, the event metric value determination formula illustrated above includes an aggregation of changes in values of gameplay metrics corresponding the event metric, i.e., gameplay metric #1 and #2. As illustrated, the aggregation may be weighted by applying factors to certain changes in the values of the gameplay metrics. For example, as shown, change #1 in the value of gameplay metric #1 may be weighted by applying a factor #1, and change #2 in the value of gameplay metric #2 may be weighted by applying a factor #X. As described above, such weighted aggregation may be based on one or more types of gameplay desired by the provider(s) of the online games during the event time period. For instance, change #1 may correspond to the user defeating a super boss in the first online game. As described above, the weighted aggregation illustrated above may be based on time periods within the event time period. For instance, change #2 may correspond to a change in the value of gameplay metric #2 during a certain period (e.g., on a Monday) within the event time period.

By way of non-limiting example, the provider(s) of the online games may desire the users to undertake military actions in the first and second online games during a certain period, for example on a given Sunday. In that example, a factor of 2 may be specified by the provider(s) of the online games, e.g., through the event metric value determination formula included in the event information 202, such that the changes values of military power gameplay metrics by the users in the first online game and second online game on the given Sunday will be counted as double. An exemplary formula including such a factor is illustrated below:

Event Metric Value=(Change in Military Power in the first or second game on the given Sunday)× 2+(Change in Military Power in the first or second game on any other days)×1

In this way, the users of the online games may be incentivized to undertake military actions on the given Sunday. As will be discussed in connection with the event notification component 126, information regarding the weighted aggregation for determining event metric value may be notified to the users of the online games through the event notification component 126.

As still illustrated in FIG. 2, the event information 202 may include award criteria for determination of awards to be distributed to the users upon conclusion of the competitive event. For example, the award criteria may specify that certain awards may be distributed to the users for a certain level of achievements during the event time period as reflected by the values of event metric(s) included in the event information 202. The award criteria may include various thresholds such that users must meet those thresholds to be eligible to receive certain awards. For example, without limitation, the award criteria may specify a threshold value of event metric #1 to be achieved by the user to receive awards.

As still shown in FIG. 2, the event information 202 may include scoring/ranking formula information for determination of user ranks or scores at the conclusion of the event time period. The scoring/ranking formula may include a function of event metric values achieved by the users during the event time period. As will be discussed below, the user rankings and/or scores of the completive event may be notified to the users, for example, via the event notification component 126.

FIG. 3A illustrates an example of a competitive cross-game event through a timeline. As can be seen in FIG. 3A, the server 102, for example, via the cross-game event component 120 may facilitate a competitive event for users of the online games during an event time period 302. At the end of event time period 302, as shown, values of event metric(s) associated with the competitive event(e.g., user scoring, ranking, outcome, awards, and/or any other types of event results) may be determined.

FIG. 3B illustrates another example of a competitive cross-game event. In this example, as shown, sub-periods may be specified within the event time period 302 such that the user should undertake certain gameplay reflected by a gameplay metric in a respective online game during a corresponding sub-period. In this example, the sub-period 304a is associated with a gameplay metric #1 in online game

1 such that users should undertake gameplay (e.g., military actions) reflected by gameplay metric #1 during this period; associated with a gameplay metric #2 such that users should undertake gameplay (e.g., commerce actions) reflected by gameplay metric #2 in online game #2 during this period; associated with a gameplay metric #3 in online game #1 such that users should undertake gameplay (e.g., farming actions) reflected by gameplay metric #3 during this period; and any other gameplay metric(s). As shown, the values of the gameplay metric(s), in this example, may be determined at the end of individual sub-periods 304 for determination of the event result(s) at the end of the event time period 302. In some examples, the sub-periods 304s illustrated in FIG. 3B may be used for temporarily weighting the changes in values of the gameplay metrics for determination of the event metric value as described above.

FIG. 4 illustrates an example of facilitating a competitive event using the event information illustrated in FIG. 2. It will be described with references to FIGS. 1-2. As can be seen in this example, the server 102, for example, via the cross-game event component 120 may facilitate a competitive cross-game event 402 based on the event information 202 described in FIG. 2. As illustrated, in operations, facilitating the competitive cross-game event may involve maintaining state information 406 of the cross-game event. As shown, the state information 406 may include participant information, ranking information, event time information, and/or any other state information relating to the cross-game event facilitated by server 102 at a given time. As also illustrated, facilitating the cross-game competitive event may include maintaining event data 408 in accordance with the event information 404. As shown, the event data may include values of the event metric(s) associated with the cross-game competitive event for individual users (e.g., user #1, #2, and so on). As described above and illustrated here, determining the values of the event metric(s) may include obtaining values of the gameplay metric(s) corresponding to the event metric from individual online game host servers 128. As shown, the gameplay metric information 410 may be obtained by the server 102 from the servers 128, e.g., via the gameplay metric component 118 provided by the individual servers 128.

Returning to FIG. 1, the event award component 124 may be configured to determine awards for distribution to the users upon conclusion of the cross-game competitive event facilitated by the cross-game event component 120. The award determination by the event award component 124 may be based on values of the event metric(s) associated with the competitive event for the individual users. For example, the values of the event metric(s) for the individual users may reflect their relative achievements in the online games. As described above, in some examples, the event award component 124 may determine user rankings, scores, grades, ratings, and/or any event results, and determine the awards for distribution to the users based on such event results. The awards determined by the event award component 124 may include virtual items and/or virtual currencies usable in the online games, for example, the first, second, and any other online games hosted by the provider(s) of the online games.

By way of non-limiting example, at the conclusion of a cross-game competitive event facilitated by the cross-game event component 120, the event award component 124 may determine awards for distribution to the users of the first and second online games. In that example, the event award component 124 may obtain award criteria, for example, from the event information component 122. The award criteria may specify that for users that achieved values of the event metric associated with the cross-game competitive event above a first threshold value, e.g., 100 gems (virtual currency), may be distributed to the user inventory associated with those users; that for users that achieved values of the event metric associated with cross-game competitive event above a second threshold value, e.g., 50 gems, may be distributed to the user inventory associated with those users; that for users that achieved values of the event metric associated with cross-game competitive event above a third threshold value, e.g., 25 gems, may be distributed to the user inventory associated with those users; and so on.

The event notification component 126 may be configured to generate notifications that notify event information regarding competitive events facilitated by the cross-game event component 120. The notifications generated by the event notification component 126 may be presented to the users in a graphical user interface associated with the online games. The generated notifications may include relevant information regarding a cross-game completive event that will be facilitated by the cross-game event component 120 during an event time period. The relevant information regarding the cross-game competitive event may include the event time information, the event metric information, the event award information, and/or any other types of event information. By way of non-limiting example, a notification generated by the event notification component 126 may include information notifying users that a competitive cross-game event will be facilitated during an upcoming week— i.e., the event time period, that the user should gain as much military power in the first online and second online games as possible during the event time period—i.e., the event metric, and that an award of 100 gems will be distributed to users gaining top 50 highest military power points in the first and second online games during the event time period. In some examples, the notification generated by the event notification component 126 may include information indicating certain gameplay by the users in respective online game(s) may be weighted for the determination of the value of the event metric. For example, the notification may include information notifying the users that military power points gained by the users by defeating a super boss in the first online game may be counted as double for determination of the event metric values for the users. In some examples, the notifications generated by the event notification component 126 may be presented to the users of the online games externally, for example via push notifications, email messages, voice notifications, visual alert, and/or any other external medium.

The server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program components. The computer program components may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts, and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a FireWire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processors 108 and 130 are configured to provide information-processing capabilities in server 102. As such, processors 108 and 130 may include one or more of a digital processor, an analog processor, a digital circuit designed to process information, an analog circuit designed to process information, a state machine, and/or other mechanisms for electronically processing information. Although processors 108 and 130 are shown in FIG. 1 as a single entity, this is for illustrative purposes only. In some implementations, processors 108 and 130 may include a plurality of processing units. These processing units may be physically located within the same device, or processors 108 and 130 may represent processing functionality of a plurality of devices operating in coordination. The processors 108 and 130 may be configured to execute components 112, 114, 116, 118, 120, 122, 124, and 126. Processor 108 may be configured to execute components 112, 114, 116, 118, 120, 122, 124, and 126 by software; hardware; firmware; some combination of software, hardware, and/or firmware; and/or other mechanisms for configuring processing capabilities on processor 108.

It should be appreciated that although components 112, 114, 116, 118, 120, 122, 124, and 126 are illustrated in FIG. 1 as being co-located within a single processing unit, in implementations in which processor 108 includes multiple processing units, one or more of components 112, 114, 116, 118, 120, 122, 124, and 126 may be located remotely from the other components. The description of the functionality provided by the different components 112, 114, 116, 118, 120, 122, 124, and 126 described below is for illustrative purposes, and is not intended to be limiting, as any of components 112, 114, 116, 118, 120, 122, 124, and 126 may provide more or less functionality than is described. For example, one or more of components 112, 114, 116, 118, 120, 122, 124, and 126 may be eliminated, and some or all of its functionality may be provided by other ones of components 112, 114, 116, 118, 120, 122, 124, and 126. As another example, processor 108 may be configured to execute one or more additional components that may perform some or all of the functionality attributed below to one of components 112, 114, 116, 118, 120, 122, 124, and 126.

Figure 5:
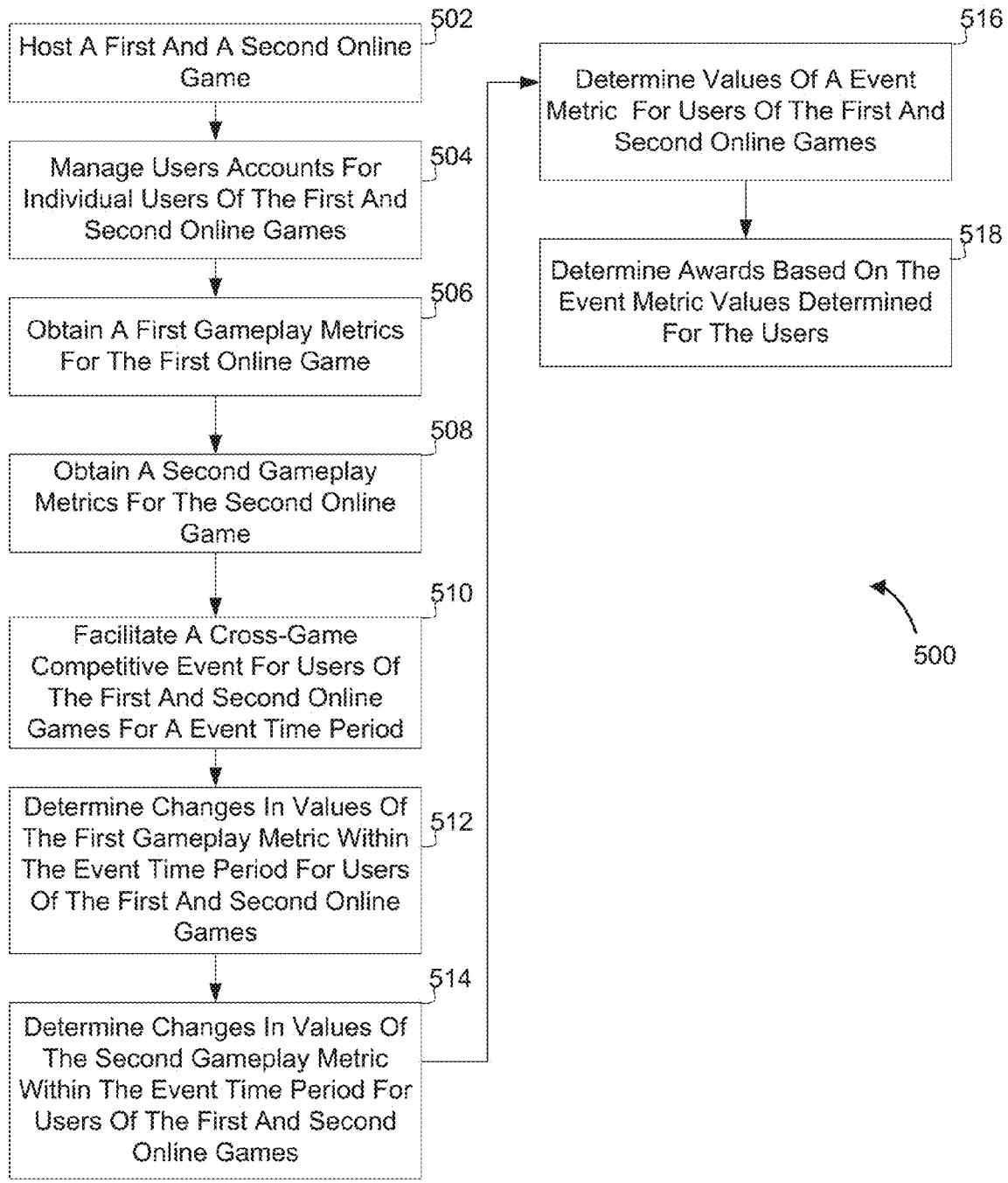
FIG. 5 illustrates one exemplary method for facilitating cross-game competitive events in accordance with the disclosure.

FIG. 5 illustrates one exemplary method 500 for facilitating a cross-game competitive event in accordance with the disclosure. The operations of method 500 presented below are intended to be illustrative. In some embodiments, method 500 may be accomplished with one or more additional operations not described, and/or without one or more of the operations discussed. Additionally, the order in which the operations of method 500 illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, a first online game and a second online game may be hosted. The first online game may be associated with a first game space in which gameplays may be facilitated for users of the first online game. Within the first game space, users may control one or more of an element in the first game space. The second game component may be configured with functionalities described above for first game component. A second game space may be associated with the second online game. The second game space may facilitate gameplays similar to or different from those provided in the first game space. The second online game may be separate and discrete from the first online game such that users of the first online game may not interact with the second game space from the first online game. In some implementations, operation 502 may be performed by a first game component and a second game component the same as or similar to first game component 112 and second game component 114 (shown in FIG. 1 and described herein).

At an operation 504, user accounts associated with the users of the first and second online games may be managed. The user accounts managed in operation 504 may include user information and/or user profiles. The user information may include user parameter reflecting user progresses, attributes, entities controlled by the users, and/or any other user aspects related to the online games. The user profiles may include user-identifying information, demographical information, time zone, and/or any other types of profile information related to the individual users. In some examples, the user accounts managed in operation 504 may correspond to online games individually. For example, a set of user accounts may be managed for the first online game and another set of user accounts may be managed for the second online game. In some implementations, operation 504 may be performed by one or more user components the same as or similar to user components 116a and/or 116b (shown in FIG. 1 and described herein).

At operations 506 and 508, a first and second gameplay metric and may be obtained for users of the first and second online games. The first or the second gameplay metric obtained in operation 506 may include any variable related to gameplay by users in a respective game online game. The first gameplay metric may quantify one or more aspects of user gameplays in the first online game, and the second gameplay metric may quantify one or more aspects of user gameplays in the second online game. In some implementations, operations 506 and 508 may be performed by a gameplay metric component the same as or similar to gameplay metric component 118 (shown in FIG. 1 and described herein).

At an operation 510, a cross-game competitive event may be facilitated for an event time period for the users of the first and second online games. A cross-game competitive event facilitated in operation 510 may be associated with one or more event metrics. The event metric(s) associated with the competitive event facilitated by the cross-game event component may be used to quantify achievements by individual users in multiple online games during an event time period. A given event metric may correspond to one or more gameplay metrics of the multiple online games. For example, the event metric may correspond to a gameplay metric in the first online game and a second gameplay metric in the second online game. Facilitating the competitive event by the cross-game event component may include determining values of the event metric(s) associated with the competitive event for individual users. In some implementations, operation 510 may be performed by a cross-game event component 120 the same as or similar to cross-game event component 120 (shown in FIG. 1 and described herein).

At an operations 512 and 514, changes in values of the first gameplay metric and second gameplay metric may be determined for users of the first and second online. This may involve querying for user gameplay metric values in the first and second online games during the event time period. In some implementations, operations 512 and 514 may be performed by a cross-game event component the same as or similar to cross-game event component 120 (shown in FIG. 1 and described herein).

At an operation 516, values of an event metric associated with the cross-game competitive event may be obtained. This may involve aggregating changes in gameplay metric values determined in operations 512 and 514. In some implementations, operation 516 may be performed by a cross-game event component the same as or similar to cross-game event component 120 (shown in FIG. 1 and described herein).

At an operation 518, awards may be determined for distribution to users based on the event metric values determined in operation 516. The award determined in operation 518 may include virtual items, virtual currencies, and/or any other elements that are usable in the first and/or second online games. In some implementations, operation 518 may be performed by an event award component the same as or similar to event award component 124 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating a competitive event that takes place in multiple online games, the system comprising:
   one or more physical processors configured by machine-readable instructions to:
   host a first online game and a second online game of the multiple online games over a network such that the users are able to access the first online game and the second online game via client computing platforms associated with the users, the first online game being associated with a first game space and the second online game being associated with a second game space such that the first game space is discrete and separate from the second game space;
   determine first values of a first gameplay metric for the users in the first online game, the first values reflecting one or more aspects of gameplay in the first online game by the users;
   determine second values of a second gameplay metric for the users in the second online game, the second values reflecting one or more aspects of the gameplay in the second online game by the users; and
   facilitate the competitive event for the users of the first online game and the second online game, the competitive event taking place within an event time period, wherein facilitating the competitive event includes:
      determining values of a first event metric for the users such that a value of the first event metric is determined for a first user of the users based on an aggregation of a change in a first value of the first gameplay metric for the first user and a change in a second value of the second gameplay metric for the first user within the event time period, wherein determining the values of the first event metric includes:
         aggregating, by the one or more physical processors, the changes in the first values of the first gameplay metrics and the second values of the second gameplay metrics within the event time period; and
         weighting, by the one or more physical processors, the changes in the first values of the first gameplay metrics and/or the second values of the second gameplay metrics for at least a portion that is less than all of the event time period such that both the change in the first value and the change in the second value for the first user are included in determining the value of the first event metric for the first user, but the change in the first value is weighted to have a greater or lesser impact on the event metric than the change in the second value for at least a portion of the event time period;
      effectuating transmission of information communicating relative performance of the users compared to one another in the competitive event to the client computing platforms associated with the users such that the relative performance of the users compared to one another is presented to the users via the client computing platforms, and upon conclusion of the event time period, distributing awards to the users based on their relative achievement within the first online game and/or the second online game as reflected by the value of the first event metric.

2. The system of claim 1, wherein the aggregation of the changes in the first values of the first gameplay metrics and the second values of the second gameplay metrics for the first user within the event time period is weighted by the one or more physical processors.

3. The system of claim 2, wherein the aggregation of the changes in the first values of the first gameplay metrics and the second values of the second gameplay metrics for the first user within the event time period is weighted, by the one or more physical processors, based on one or more types of gameplay corresponding to the first gameplay metric by the first user in the first online game and/or based on the one or more types of gameplay corresponding to the second gameplay metric by the first user in the second online game within the event time period.

4. The system of claim 3, wherein the one or more types of gameplay based on which the aggregation is weighted include a military action, a logistic action, a planning action, a commerce action, social interaction with other users, participation in a quest, participation in a campaign, and/or participation in team play within the first online game by the first user.

5. The system of claim 1, wherein the one or more physical processors are further configured to generate a notification including event information regarding the competitive event, the event information including information indicating the awards for potential distribution to the users based on the first event metric.

6. The system of claim 5, wherein the one or more physical processors are further configured to effectuate transmission of the notification generated to the users through a medium external to the multiple online games.

7. The system of claim 6, wherein the medium external to the multiple online games includes one or more of a push notification, an electronic mail message, a visual alert, and/or a voice alert.

8. The system of claim 1, wherein the awards distributed to the users include virtual items and/or virtual currencies usable in the first online game and/or the second online game.

9. A method for facilitating a competitive event that takes place in multiple online games, the method being implemented in one or more physical processors configured to execute computer programs, the method comprising:

hosting, by the one or more physical processors, a first online game and a second online game of the multiple online games over a network such that the users are able to access the first online game and the second online game via client computing platforms associated with the users, the first online game being associated with a first game space and the second online game being associated with a second game space such that the first game space is discrete and separate from the second game space;

determining, by the one or more physical processors, first values of a first gameplay metric for the users in the first online game, the first values reflecting one or more aspects of gameplay in the first online game by the users;

determining, by the one or more physical processors, second values of a second gameplay metric for the users in the second online game, the second values reflecting one or more aspects of the gameplay in the second online game by the users; and facilitating, by the one or more physical processors, the competitive event for the users of the first online game and the second online game, the competitive event taking place within an event time period, wherein facilitating the competitive event includes:

determining, by the one or more physical processors, values of a first event metric for the users such that a value of the first event metric is determined for a first user of the users based on an aggregation of a change in a first value of the first gameplay metric for the first user and a change in a second value of the second gameplay metric for the first user within the event time period, wherein determining the values of the first event metric includes:

aggregating, by the one or more physical processors, the changes in the first values of the first gameplay metrics and the second values of the second gameplay metrics within the event time period; and weighting, by the one or more physical processors, the changes in the first values of the first gameplay metrics and/or the second values of the second gameplay metrics for at least a portion that is less than all of the event time period such that both the change in the first value and the change in the second value for the first user are included in determining the value of the first event metric for the first user, but the change in the first value is weighted to have a greater or lesser impact on the event metric than the change in the second value for at least a portion of the event time period;

effectuating transmission, by the one or more physical processors, of information communicating relative performance of the users compared to one another in the competitive event to the client computing platforms associated with the users such that the relative performance of the users compared to one another is presented to the users via the client computing platforms, and upon conclusion of the event time period, distributing, by the one or more physical processors, awards to the users based on their relative achievement within the first online game and/or the second online game as reflected by the value of the first event metric.

10. The method of claim 9, wherein the aggregation of the changes in the first values of the first gameplay metrics and the second values of the second gameplay metrics for the first user within the event time period is weighted by the one or more physical processors.

11. The method of claim 10, wherein the aggregation of the changes in the first values of the first gameplay metrics and the second values of the second gameplay metrics for the first user within the event time period is weighted, by the one or more physical processors, based on one or more types of gameplay corresponding to the first gameplay metric by the first user in the first online game and/or based on the one or more types of gameplay corresponding to the second gameplay metric by the first user in the second online game within the event time period.

12. The method of claim 11, wherein the one or more types of gameplay based on which the aggregation is weighted include a military action, a logistic action, a planning action, a commerce action, social interaction with other users, participation in a quest, participation in a campaign, and/or participation in team play within the first online game by the first user.

13. The method of claim 9, further comprising generating a notification including event information regarding the competitive event, the event information including information indicating the awards for potential distribution to the users based on the first event metric.

14. The method of claim 13, further comprising effectuating transmission of the notification generated to the users through a medium external to the multiple online games.

15. The method of claim 14, wherein the medium external to the multiple online games includes one or more of a push notification, an electronic mail message, a visual alert, and/or a voice alert.

16. The method of claim 9, wherein the awards distributed to the users include virtual items and/or virtual currencies usable in the first online game and/or the second online game.

* * * * *